US012760748B2

(12) United States Patent
White et al.

(10) Patent No.: US 12,760,748 B2
(45) Date of Patent: Oct. 13, 2026

(54) JET PUMP SYSTEM

(71) Applicant: Honeywell International Inc., Charlotte, NC (US)

(72) Inventors: Christopher James White, Yeovil (GB); Gary Hiroshi Kumagai, Walnut, CA (US); Albert Mikan, Prague (CZ); David Alan Plummer, Marnhull (GB)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 19/040,654

(22) Filed: Jan. 29, 2025

(65) Prior Publication Data

US 2026/0218732 A1 Jul. 30, 2026

(51) Int. Cl.

*F04F 5/18* (2006.01)
*B64D 13/06* (2006.01)
(Continued)

(52) U.S. Cl.

CPC ................ *F04F 5/18* (2013.01); *B64D 13/06* (2013.01); *B64D 15/04* (2013.01); *F04F 5/44* (2013.01);
(Continued)

(58) Field of Classification Search

CPC ........ F04F 5/14; F04F 5/16; F04F 5/18; F04F 5/44; F04F 5/46; F04F 5/461; F04F 5/463; F04F 5/466; F04F 5/48; B64D 13/06; B64D 2013/0603; B64D 2013/0607; B64D 2013/0618; B64D 2013/0666; B64D 15/02; B64D 15/04; F02C 9/18; F02C 6/08; F16K 11/083; F16K 11/085; F16K 11/087;
(Continued)

(56) References Cited

U.S. PATENT DOCUMENTS

| | | | |
|---|---|---|---|
| 1,421,843 | A | 7/1922 | Schmidt |
| 3,367,256 | A | 2/1968 | Townsend et al. |

(Continued)

FOREIGN PATENT DOCUMENTS

| | | | |
|---|---|---|---|
| EP | 1923553 | A2 | 5/2008 |
| EP | 3219956 | A2 | 9/2017 |

(Continued)

OTHER PUBLICATIONS

U.S. Appl. No. 18/586,158, filed Feb. 23, 2024, by Plummer.
Extended Search Report from counterpart European Application No. 26151762.7 dated Jun. 19, 2026, 8 pp.

*Primary Examiner* — Loren C Edwards
(74) *Attorney, Agent, or Firm* — Shumaker & Sieffert, P.A.

(57) ABSTRACT

A bleed system including control circuitry and one or more jet pump assemblies. The control circuitry is configured to receive a signal indicative of a fluid parameter in the bleed system and cause the one or more jet pump assemblies to alter a mixing ratio of a higher pressure gas and a lower pressure gas based on the signal. The one or more jet pump assemblies are configured to combine the lower pressure gas and the higher pressure gas to generate a supply gas. The one or more jet pump assemblies are configured to provide the supply gas to one or more gas loads in the bleed system. In examples, the control circuitry is configured to establish a system setpoint for the fluid parameter based on an operating status of the one or more gas loads.

20 Claims, 7 Drawing Sheets

(51) Int. Cl.
*B64D 15/04* (2006.01)
*F04F 5/44* (2006.01)
*F02C 9/18* (2006.01)

(52) U.S. Cl.
CPC ................ *B64D 2013/0603* (2013.01); *B64D 2013/0607* (2013.01); *F02C 9/18* (2013.01)

(58) Field of Classification Search
CPC .. F05D 2260/601; B01F 23/10; B01F 25/312; B01F 25/31242; B01F 25/31243
See application file for complete search history.

(56) References Cited

U.S. PATENT DOCUMENTS

| | | | | |
|---|---|---|---|---|
| 3,423,011 | A | 1/1969 | Stepp | |
| 3,441,045 | A | 4/1969 | Malone | |
| 3,552,883 | A | 1/1971 | Weatherbee | |
| 4,285,466 | A | 8/1981 | Linscheid et al. | |
| 6,701,715 | B2 | 3/2004 | Anderson et al. | |
| 6,779,360 | B2 | 8/2004 | Kawamura et al. | |
| 7,306,644 | B2 | 12/2007 | Leigh et al. | |
| 7,334,427 | B2 | 2/2008 | Ozaki et al. | |
| 8,099,973 | B2 | 1/2012 | Sampson et al. | |
| 8,672,644 | B2 | 3/2014 | Kidd et al. | |
| 8,985,966 | B2 | 3/2015 | Sampson et al. | |
| 9,260,974 | B2 | 2/2016 | Hasting et al. | |
| 11,117,669 | B2 | 9/2021 | Fletcher et al. | |
| 11,460,124 | B2 | 10/2022 | Li et al. | |
| 11,828,223 | B2 | 11/2023 | Briley et al. | |
| 2003/0205049 | A1 | 11/2003 | Anderson et al. | |
| 2007/0125092 | A1 | 6/2007 | Wolfe et al. | |
| 2008/0115503 | A1 | 5/2008 | Vasquez et al. | |
| 2008/0118371 | A1 | 5/2008 | Vasquez et al. | |
| 2008/0247881 | A1 | 10/2008 | Sampson et al. | |
| 2010/0170574 | A1 | 7/2010 | Fauque et al. | |
| 2012/0117977 | A1 | 5/2012 | Childers et al. | |
| 2013/0192250 | A1 | 8/2013 | Glahn et al. | |
| 2014/0255218 | A1 | 9/2014 | Sarshar et al. | |
| 2015/0059350 | A1 | 3/2015 | Kolvick et al. | |
| 2016/0138472 | A1 | 5/2016 | Chartier et al. | |
| 2016/0222986 | A1 | 8/2016 | Mason et al. | |
| 2017/0074172 | A1 | 3/2017 | Little | |
| 2017/0218852 | A1 | 8/2017 | Klosinski et al. | |
| 2018/0312262 | A1 | 11/2018 | Wiegers et al. | |
| 2019/0153963 | A1 | 5/2019 | Kitaguchi | |
| 2022/0153420 | A1* | 5/2022 | Prieto Padilla | B64D 13/06 |
| 2022/0381181 | A1* | 12/2022 | Briley | F02C 9/18 |
| 2023/0392615 | A1 | 12/2023 | Kumagai et al. | |

FOREIGN PATENT DOCUMENTS

| | | | |
|---|---|---|---|
| EP | 4095370 | | 11/2022 |
| EP | 4290064 | | 12/2023 |
| EP | 4607036 | | 8/2025 |
| JP | 4882471 | B2 | 2/2012 |
| WO | 2022122247 | A1 | 6/2022 |

* cited by examiner

JET PUMP SYSTEM

STATEMENT REGARDING FEDERALLY SPONSORED RESEARCH OR DEVELOPMENT

This invention was made with Government support under S0194922 awarded by UKRI. The non-US Government has certain rights in the invention.

TECHNICAL FIELD

The present disclosure relates to a bleed system, such as a bleed air system on-board an aircraft.

BACKGROUND

Bleed systems are used to extract pressurized air from turbine engines for various uses, including supplying auxiliary power, cooling air, and other air loads served by the system. For example, aircraft bleed systems may extract pressurized air from a turbine engine supplying thrust to the aircraft to provide air to various air loads and air-use systems, such as to an environmental control system configured to pressurize a cabin of the aircraft, an air drive unit configured to pressurize hydraulics, an anti-icing system configured to remove and/or limit ice on a wing of the aircraft, an inert gas generating system configured to pressurize a fuel tank of the aircraft, and other air loads The bleed system provides the bleed air at a pressure, temperature, and mass flow sufficient to ensure an adequate bleed air supply to the served loads.

SUMMARY

The present disclosure describes a bleed system (also referred to herein as a bleed air system) that includes control circuitry and a jet pump assembly. The jet pump assembly is configured to receive a relatively lower pressure gas and a relatively higher pressure gas from a turbine engine or another system. In some examples, the lower pressure gas and the higher pressure gas may be air, and the turbine engine may be an aircraft turbine configured to provide thrust to an aircraft. The jet pump assembly is configured to combine the lower pressure gas and the higher pressure gas to generate a supply gas at an intermediate pressure and temperature, which may be supplied to one or more gas loads served by the bleed system. In some examples, control circuitry is configured to receive a signal indicative of a fluid parameter (e.g., a pressure, a temperature, and/or a flow rate) in the bleed system and cause the jet pump assembly to alter the mixture of the lower pressure gas and the higher pressure gas.

In examples, a system comprises: a jet pump assembly configured to receive a lower pressure gas from a lower pressure stage of a turbine engine and receive a higher pressure gas from a higher pressure stage of the turbine engine, wherein the jet pump assembly is configured to combine the lower pressure gas and the higher pressure gas to produce a supply gas, wherein the jet pump assembly is configured alter a mixing ratio of the higher pressure gas to the lower pressure gas combined by adjusting a position of a needle body of the jet pump assembly, wherein the jet pump assembly is configured to establish: a first mode wherein the supply gas is largely comprised of the lower pressure gas, a second mode wherein the supply gas includes both the lower pressure gas and the higher pressure gas, and a third mode wherein the supply gas largely comprised of the higher pressure gas; and control circuitry configured to receive a signal indicative of a fluid parameter of the supply gas, wherein the control circuitry is configured to cause the jet pump assembly to establish the first mode, the second mode, or the third mode based on the signal.

In examples, an air system for an aircraft comprises: a turbine engine including at least a lower pressure stage configured to issue a lower pressure gas and a higher pressure stage configured to issue a higher pressure gas as a gas stream flows through the lower pressure stage and the higher pressure stage, a jet pump assembly configured to receive the lower pressure gas and configured to receive the higher pressure gas, wherein the jet pump assembly is configured to combine the lower pressure gas and the higher pressure gas to produce a supply gas, wherein the jet pump assembly is configured alter a mixing ratio of the higher pressure gas to the lower pressure gas combined by adjusting a position of a needle body of the jet pump assembly, wherein the jet pump assembly is configured to establish: a first mode wherein the supply gas is largely comprised of the lower pressure gas, a second mode wherein the supply gas includes both the lower pressure gas and the higher pressure gas, and a third mode wherein the supply gas is largely comprised of the higher pressure gas; a check valve configured to allow the lower pressure gas to flow from the lower pressure stage to the jet pump assembly, wherein the check valve is configured to limit the higher pressure gas from flowing from the jet pump assembly to the lower pressure stage; and control circuitry configured to receive a signal indicative of a fluid parameter of the supply gas, wherein the control circuitry is configured to cause the jet pump assembly to establish the first mode, the second mode, or the third mode based on the signal.

In examples, method comprises: receiving, by control circuitry, a signal indicative of a fluid parameter of a supply gas in a system, wherein the supply gas is generated by a jet pump assembly configured to mix a lower pressure gas and a higher pressure gas to produce the supply gas, wherein the jet pump assembly is configured alter a mixing ratio of the higher pressure gas to the lower pressure gas combined by adjusting a position of a needle body of the jet pump assembly, and wherein the jet pump assembly is configured to define: a first mode wherein the supply gas is largely comprised of the lower pressure gas, a second mode wherein the supply gas includes both the lower pressure gas and the higher pressure gas, and a third mode wherein the supply gas is largely comprised of the higher pressure gas; and causing, by the control circuitry, the jet pump assembly to establish the first mode, the second mode, or the third mode based on the signal.

The details of one or more examples are set forth in the accompanying drawings and the description below. Other features, objects, and advantages will be apparent from the description and drawings, and from the claims.

DETAILED DESCRIPTION

Figure 1:
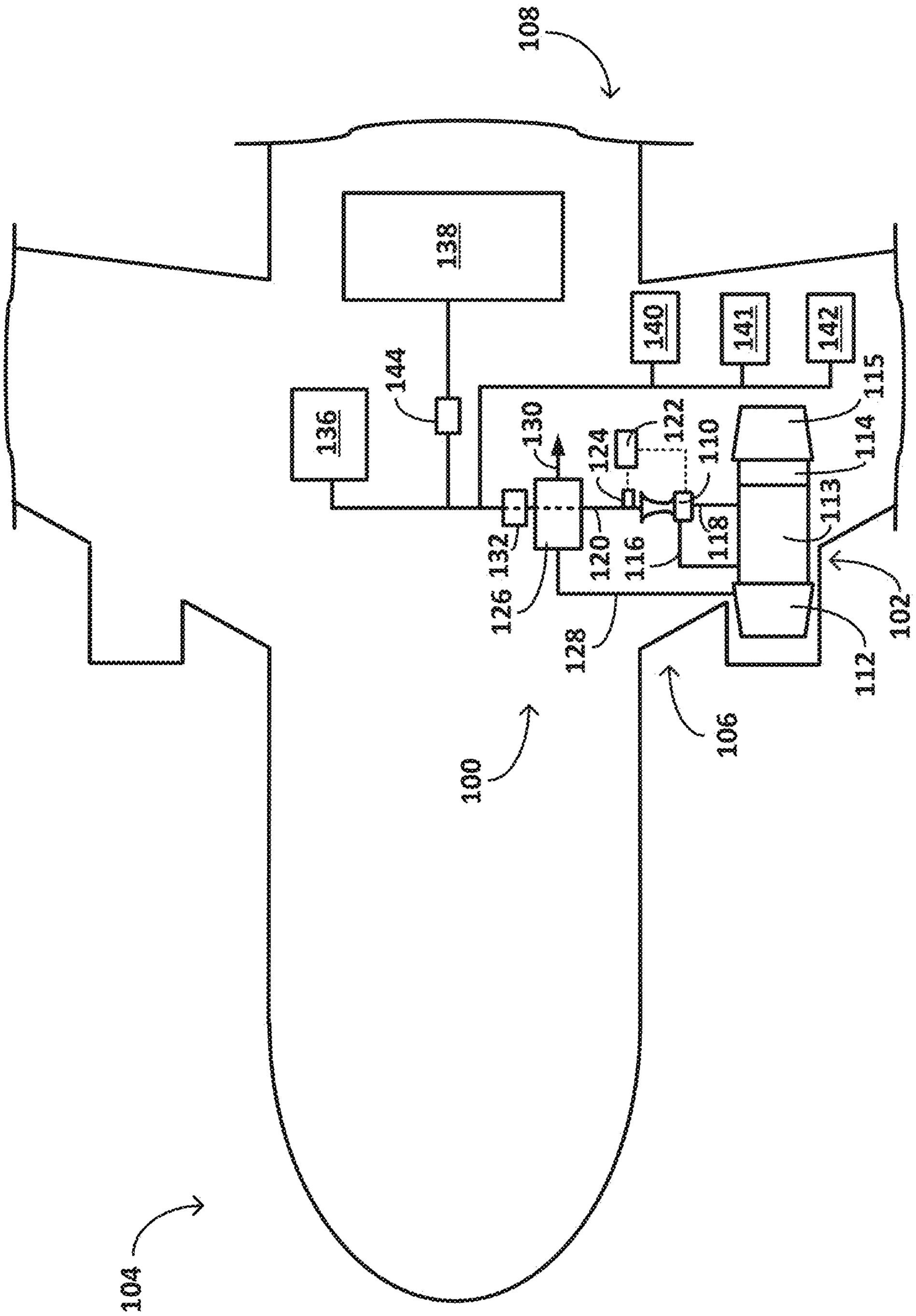
FIG. 1 is a schematic illustration of an example bleed system of an aircraft.

Turbine engines (e.g., gas turbines) generally intake and compress a gas such as air in a compressor section prior using the gas to combust fuel for engine thrust. The compressor section generally receives the gas (e.g., air) through an intake and compresses the gas using a series of compressor stages. The compressor stages progressively increase the gas pressure, in order to provide the gas in sufficient quantity and pressure to a combustion section. The combustion section mixes the gas and a fuel and causes a combustion. The combustion generates rapidly expanding combustion gases which may be utilized to rotate a turbine shaft and/or produce engine thrust. In aircraft engines, in addition to causing some amount of shaft rotation to drive the compressor section, the combustion gases are ejected through an exhaust section to generate engine thrust for the aircraft.

In some cases, a portion of the compressed gas is diverted from the compressor section of the turbine engine as a bleed gas (e.g., bleed air) prior to entering the combustion section. The bleed gas may be extracted from the compressor section and provided to a bleed system configured to distribute the bleed gas to various gas loads (also referred to as air loads in some examples) operating elsewhere in the system. For example, bleed gas may be extracted from one or more compressor stages of a turbine engine during aircraft flight to support applications such as one or more of an Environmental Control System (ECS) system of a passenger cabin, wing anti-icing, air-driven motors, hydraulic pressurization, fuel tank pressurization, or other uses. The bleed system may use a network of ducts, valves, regulators, and other components to route the bleed gas from the compressor section of the turbine engine to various locations within the aircraft. The bleed system is typically configured to extract sufficient bleed gas from the turbine engine to substantially maintain the air pressure in the distribution system within a specific pressure range.

In some bleed air systems, bleed gas is extracted from multiple compressor stages of the turbine engine in order to provide sufficient gas to the one or more gas loads served. For example, the bleed system may be configured to extract a relatively lower pressure gas (e.g., low pressure air) from a lower pressure stage of the compressor stages and a relatively higher pressure gas (e.g., high pressure air) from a higher pressure stage of the compressor stages. For example, the lower pressure gas may be intermediate pressure air ("IP air") from an intermediate compressor stage of a turbine engine and the higher pressure gas may be high pressure air ("HP air") from a higher compressor stage of the turbine engine. The higher pressure gas extracted from the higher pressure stage generally has a higher pressure and temperature than the lower pressure gas air extracted from the lower pressure stage. As a non-limiting example, in the context of some aircraft, the higher pressure gas may be at about 47.63 Atmospheres (about 700 pounds per square inch (psi)) and a temperature of 1000-1400 degrees Fahrenheit (about 538-760 degrees Celsius) and the lower pressure gas may be at 500-700 degrees Fahrenheit (about 260-371 degrees Celsius).

The bleed system may be configured to mix the higher pressure gas and the lower pressure gas in order to maintain the gas supply to the operating loads. In some examples, the bleed system is configured to adjust the relative amounts of higher pressure gas and lower pressure gas mixed by monitoring a control variable, such as a pressure and/or temperature of the supply gas within the bleed system. The control variable may be sensed by sensors positioned at one or more specific fixed locations in the bleed system, such as a point upstream of the gas loads being served by the bleed system. The control circuitry of the bleed system may adjust the relative amounts of higher pressure gas and lower pressure gas extracted based on a comparison between the monitored control variable and a system setpoint, or some other criteria (e.g., a number and/or identification of the one or more gas loads which may be operating).

In some examples, a bleed system may use a jet pump configured to enable the mixing of the higher pressure gas and the lower pressure gas in a mixing section of the jet pump assembly. The jet pump may be configured to accelerate the high pressure gas and reduce its pressure prior to the higher pressure gas entering the mixing section, such that the reduced pressure of the higher pressure gas is sufficient to allow the lower pressure gas to flow into the jet pump (e.g., into a suction chamber of the jet pump). This may lead to inefficiencies and/or a need for bleed system valve line up alterations when the bleed system is configured to receive bleed air from a system (e.g., a turbine engine) wherein the pressure of the higher pressure gas and the lower pressure gas may vary as the system operates.

For example, when a turbine engine is operating under greater load (e.g., during an ascent phase of an aircraft and/or higher engine throttle), the lower pressure gas (e.g., IP air) extracted from the lower pressure stage of the turbine engine may provide sufficient pressure for the operation of the gas loads. Continuing to extract and mix the higher pressure gas (e.g., HP air) from the higher pressure stage when the pressure of the lower pressure gas is sufficient may detract from the achievable fuel efficiency of the turbine engine (e.g., may increase the thrust-specific fuel consumption (TFSC)). Alternately, when the turbine engine is operating under a lesser load (e.g., during a descent phase of an aircraft and/or lower engine throttle), such that both a pressure of the higher pressure gas and a pressure of the lower pressure gas are reduced, the gas loads may require a supply of bleed air which substantially requires provision by the higher pressure gas alone. If the jet pump remains configured to reduce the pressure of the higher pressure gas at the lesser load, avoiding this pressure reduction may require operation of a bypass valve to substantially cause the higher pressure gas to bypass the jet pump completely, and/or require an increased flow of the higher pressure gas to the jet pump to compensate for the pressure reduction. Hence, a bleed system configured to continue to mix a higher pressure gas and a lower pressure gas over a range of operating conditions may detract from the fuel efficiency of a turbine engine (e.g., when the pressure of the lower pressure gas alone is generally sufficient for gas loads), and/or result in a need for bleed system valve line up alterations and/or increased higher pressure gas flow (e.g., when reductions in the pressure of higher pressure gas should be limited).

The bleed systems disclosed herein include a jet pump assembly configured to receive a flow of a higher pressure gas and a flow of a lower pressure gas to discharge a supply gas from an exhaust portion for the servicing of one or more gas loads. The jet pump assembly is configured to operate in a first mode, a second mode, and a third mode. In the first mode, for example when a pressure of the lower pressure gas may be sufficient to service the gas loads, the jet pump assembly is configured to fluidically isolate the higher pressure gas and the exhaust portion, such that extraction of higher pressure gas (e.g., from a turbine engine) is substantially avoided and the supply gas is largely comprised of the lower pressure gas. In the second mode, the jet pump assembly is configured to mix the higher pressure gas and the lower pressure gas, such that the supply gas includes a mixture of the higher pressure gas and the lower pressure gas. In the third mode, for example when the gas loads may require a supply of bleed air which substantially requires provision by the higher pressure gas alone, the jet pump assembly is configured to minimize and/or limit pressure reductions of the higher pressure gas through the jet pump assembly, and the supply gas is largely comprised of the higher pressure gas.

The jet pump assembly may be configured to limit an expansion of the lower pressure gas and/or the higher pressure gas when the jet pump assembly discharges the supply gas from the exhaust portion. For example, the jet pump assembly may include a suction nozzle fluidically coupled to a suction chamber configured to receive the lower pressure gas. The suction nozzle may be configured to limit an expansion of the lower pressure gas flowing to a mixing portion (e.g., at least when the jet pump assembly operates in the first mode). This may decrease and/or delay a need to provide the higher pressure gas for the service of gas loads, such that extraction of the higher pressure gas from a higher compression stage of the turbine engine is mitigated. In examples, the jet pump assembly is configured to limit an expansion of the higher gas flow at least when the jet pump assembly operates in the third mode, potentially mitigating an amount of the higher pressure gas required and/or a need for bleed system valve line up alterations. For example, the jet pump assembly may be configured to limit a difference between a first cross-sectional area defined by a nozzle outlet of an inner nozzle of the jet pump assembly relative to a second cross-sectional area defined by the exhaust portion of the jet pump assembly (e.g., a mixing portion of the exhaust portion).

The jet pump assembly disclosed may be configured to receive the lower pressure gas and the higher pressure gas from a turbine engine. The lower pressure gas may be air, such as an IP air produced by the turbine engine. The higher pressure gas may be air, such as an HP air produced by the turbine engine. The turbine engine may be configured to intake a gas stream (e.g., air) through an intake and compress the gas stream as the gas stream flows through a plurality of compressor stages. The turbine engine may be configured to provide the lower pressure gas as a first portion of the gas stream and provide the higher pressure gas as a second portion of the gas stream. For example, the turbine engine may be configured to provide the lower pressure gas from a lower pressure stage in a compressor section of the turbine engine (e.g., a third compressor stage) and provide the higher pressure gas from a higher pressure stage in the compressor section of the turbine engine (e.g., a seventh compressor stage). In examples, the turbine engine is configured to provide another portion of the gas stream to a combustion chamber for use as an oxidant to enable the combustion of a fuel.

The bleed system is configured to provide the supply gas discharged by the jet pump assembly to one or more gas loads configured to receive the supply gas. For example, when the supply gas is air, the bleed system may be configured to provide the supply gas to an ECS configured to cool and/or pressurize a cabin of an aircraft. As another example, in addition to or instead of the ECS, the bleed system may be configured to provide the supply gas to one or more air driven motors such as an Air Drive Unit (ADU) configured to pressurize hydraulics, an aircraft wing anti-icing system configured to remove and/or limit ice on an aircraft wing, an inert gas generating system configured to pressurize a fuel tank, and other gas loads. The bleed system may be configured to provide the supply gas to any pneumatic system configured to receive a gas. The pneumatic system may be a system configured to support the operations of aircraft.

In some examples, the bleed system includes control circuitry configured to cause the jet pump assembly to operate in one of the first mode, the second mode, or the third mode. In examples, the control circuitry is configured to cause the jet pump assembly to operate in one of the first mode, the second mode, or the third mode based on a fluid parameter (e.g., a pressure, a temperature, and/or a flow rate) of one or more of the higher pressure gas, the lower pressure gas, and/or the supply gas. In some examples (e.g., when the jet pump assembly is operating in the second mode), the control circuitry is configured to cause the jet pump assembly to alter a mixing ratio of the higher pressure gas to the lower pressure gas based on the fluid parameter. In some examples, the control circuitry is configured to cause the jet pump assembly to operate in one or the first mode, the second mode, or the third mode, and/or alter the mixing ratio of the higher pressure gas to the lower pressure gas based on an identification of one or more gas loads supplied (e.g., identification on one or more of an ECS, an ADU, an anti-icing system, a fuel pressurizing system, and/or another gas load).

Figure 2:
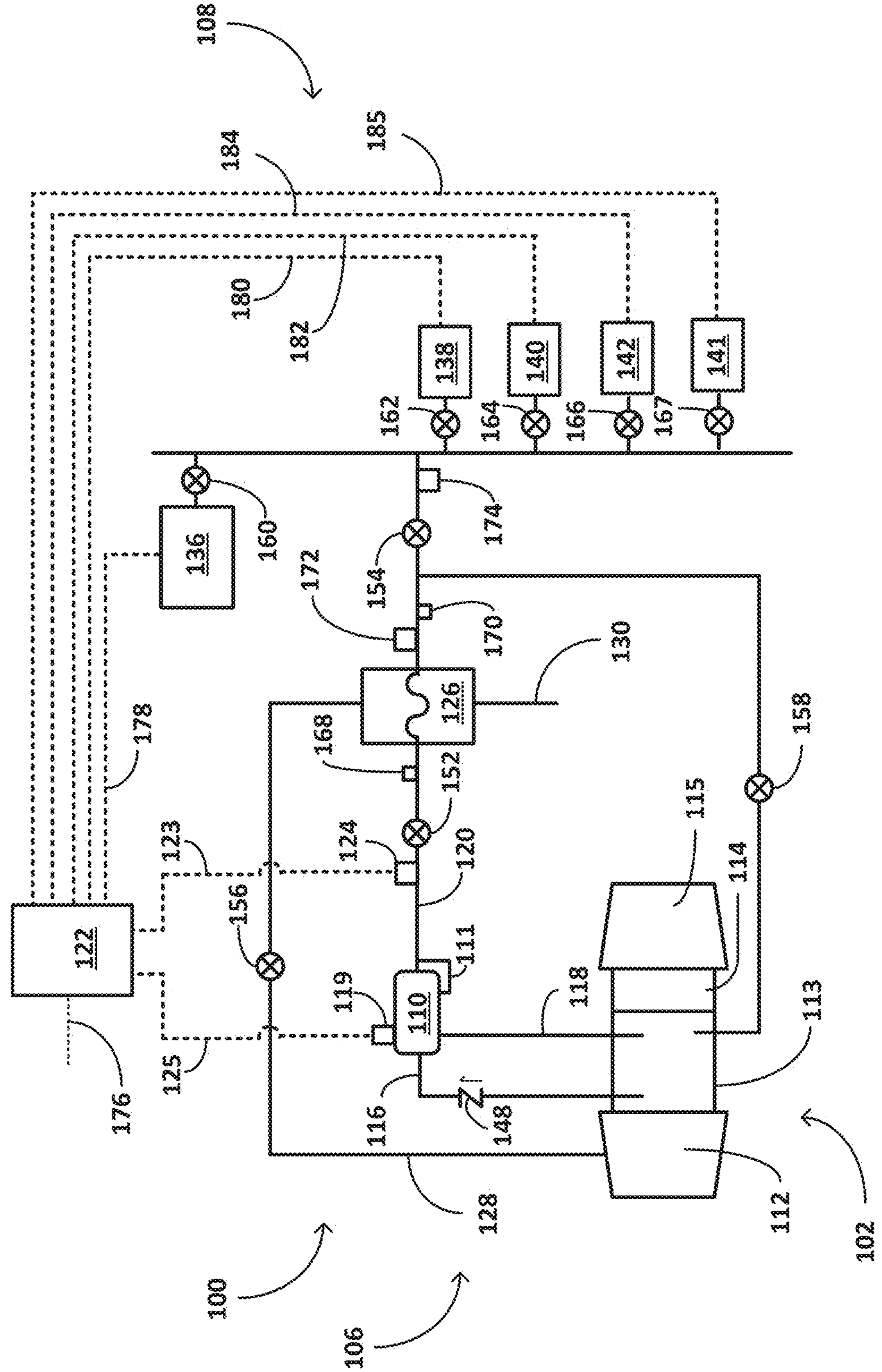
FIG. 2 is a schematic illustration of an example bleed system serving gas loads.

FIG. 1 illustrates an example bleed system 100 configured to receive a lower pressure gas and a higher pressure gas from a turbine engine 102 of an aircraft 104. FIG. 2 illustrates an example bleed system 100 including a jet pump system 106 and one or more gas loads 108. Jet pump system 106 includes a jet pump assembly 110. While aircraft 104 is primarily referred to in the description of FIG. 1, FIG. 2, and some of the other figures, bleed system 100 and other bleed systems described herein may be part of another vehicle or another non-vehicle system that includes gas loads configured to receive bleed air.

Turbine engine 102 includes a turbine engine fan section 112, a compressor section 113, a combustion section 114, and an exhaust section 115. Turbine engine 102 is configured to receive a gas flow (e.g., an air flow) via turbine engine fan section 112 and compress some portion of the gas flow in compressor section 113 using a series of compressor stages to progressively increase the gas pressure. Turbine engine 102 mixes a portion (e.g., a majority) of the compressed gas and a fuel in combustion section 114 to cause a combustion and generate combustion gases. The combustion gases and/or a bypass airflow received by a turbine engine fan section 112 eject through an exhaust section 115 to generate engine thrust for aircraft 104. Aircraft 104 may include any number of engines such as turbine engine 102 configured to generate engine thrust on aircraft 104.

Bleed system 100 is configured to divert some amount of the compressed gas from compressor section 113 prior to the compressed gas entering combustion section 114. Bleed system 100 may be configured to extract the compressed gas from multiple compressor stages of compressor section 113 of turbine engine 102. For example, bleed system 100 may extract a lower pressure air from a lower pressure compressor stage of compressor section 113 through a low pressure conduit 116 ("LP conduit 116") fluidly coupled to the lower pressure compressor stage. Bleed system, 100 may extract a higher pressure air from a higher pressure compressor stage of compressor section 113 through a high pressure conduit 118 ("HP conduit 118") fluidly coupled to the higher pressure compressor stage. In some examples, the lower pressure gas is IP air from an intermediate compressor stage of turbine engine 102 and the higher pressure gas is HP air from a high compressor stage of turbine engine 102. In other examples, however, the lower pressure gas is air from a different compressor stage of turbine engine 102 and/or the higher pressure gas is air from a different compressor stage, but is still at a higher pressure than the lower pressure gas.

Bleed system 100 includes a jet pump assembly 110 is configured receive the lower pressure gas via LP conduit 116 and the higher pressure gas via HP conduit 118. Jet pump assembly 110 is configured to provide a supply gas using one or more of the lower pressure gas or the higher pressure gas. Jet pump assembly 110 may provide the exhaust gas to a supply conduit 120 of bleed system 100.

In some examples, bleed system 100 includes a pre-cooler 126 ("PCL 126") configured to exchange heat with (e.g., cool) the supply gas issued from jet pump assembly 110 to supply conduit 120. For example, PCL 126 may be configured to cool the supply gas from a temperature greater than about 400° F. (204° C.) to temperature less than about 380° F. (193° C.). In examples, PCL 126 is configured to receive a gas flow via conduit 128 and cause heat exchange between the gas flow and the supply gas. In examples, conduit 128 is fluidly coupled to turbine engine fan section 112 of turbine engine 102. PCL 126 may be configured to discharge the gas flow via discharge conduit 130 following the heat exchange with the supply gas. In examples, bleed system 100 is configured to discharge the gas flow overboard or into the engine core compartment of aircraft 104 via discharge conduit 130.

Bleed system 100 may include a filtration unit 132 configured to condition at least some portion of the supply gas. In examples, filtration unit 132 is configured to reduce an ozone concentration within the supply gas by, for example, converting some portion of the ozone (O3) in the supply gas to diatomic oxygen (O2). Filtration unit 132 may be configured to remove substances such as hydrocarbons, water, and/or particulates from the supply gas. Although illustrated in FIG. 1 located downstream of jet pump assembly 110 and PCL 126, filtration unit 132, if present, may be located in any suitable place within bleed system 100. For example, filtration unit 132 may be located downstream of jet pump assembly 110 and upstream of PCL 126 (e.g., between jet pump assembly 110 and PCL 126), or elsewhere within bleed system 100.

Bleed system 100 is configured to distribute the supply gas from supply conduit 120 (e.g., subsequent to conditioning by PCL 126, filtration unit 132, and/or other components of bleed system 100) to one or more gas loads 108 of aircraft 104, such as environmental control system 136 ("ECS 136"), fuel tank system 138, air drive unit 140 ("ADU 140"), and/or anti-icing system 142. ECS 136 may be configured to further condition a first portion of the supply gas prior to utilizing the first portion to pressurize a cabin of aircraft 104. Fuel tank system 138 may be configured to utilize a second portion of the supply gas (e.g., a nitrogen-enriched portion) to pressurize an ullage space of fuel tank system 138. Bleed system 100 may include an inert gas generation system 144 configured to reduce an oxygen concentration of the second portion prior to the second portion entering the ullage space of a fuel tank within fuel tank system 138. ADU 140 may be a gas-driven motor configured to utilize a third portion of the supply gas to pressurize a hydraulic system of aircraft 104 to allow, for example, the operation of flaps and other control surfaces of aircraft 104 and/or landing gear of aircraft 104. Anti-icing system 142 may be configured to utilize a fourth portion of the supply gas to remove and/or limit ice on a wing or other portion of aircraft 104. Bleed system 100 may be configured to provide the supply gas to a pneumatic system 141 of aircraft 104 instead of or in addition to ECS 136, fuel tank system 138, ADU 140, or anti-icing system 142. Pneumatic system 141 may be a system, device, component, or combination thereof configured to receive supply gas from a gas source such as bleed system 100. In examples, pneumatic system 141 is a system, device, component, or combination thereof configured to support the operations of aircraft 104.

Jet pump assembly 110 is configured to operate in a first mode, a second mode, or a third mode. In the first mode, for example when a pressure of the lower pressure gas received via LP conduit 116 is sufficient to service operating gas loads of gas loads 108, jet pump assembly 110 is configured to fluidically isolate the higher pressure gas within HP conduit 118 and substantially supply conduit 120 with the lower pressure gas received via LP conduit 116, such that extraction of higher pressure gas from turbine engine 102 is limited and/or substantially avoided. In the second mode, jet pump assembly 110 is configured to mix the higher pressure gas received via HP conduit 118 and the lower pressure gas received via LP conduit 116 and provide the mixture to supply conduit 120 to service operating gas loads of gas loads 108. In the third mode, for example when the operating gas loads of gas loads 108 require a supply gas which substantially requires provision by the higher pressure gas alone (e.g., when the pressure of the lower pressure gas is too low), jet pump assembly 110 is configured to minimize and/or limit pressure reductions of the higher pressure gas received via HP conduit 118, such that valve line up alterations of bleed system 100 (e.g., operation of jet pump bypass valve 150 (FIG. 2)) and/or increased flows of the higher pressure gas via HP conduit 118 may be mitigated and/or eliminated. In examples, jet pump assembly 110 includes a translating member (e.g., needle body 230 (FIGS. 3-5)) configured to translate relative to a nozzle of jet pump assembly 110 (e.g., inner nozzle 216 (FIGS. 3-5)) to cause jet pump assembly 110 to operate in the first mode, the second mode, or the third mode, and/or to increase or decrease a mixing ratio of the higher pressure gas to the lower pressure gas (e.g., in the second mode).

Referring largely to FIG. 2, bleed system 100 may include control circuitry 122 configured to cause jet pump assembly 110 to operate in the first mode, the second mode, or the third mode, and/or to increase or decrease the mixing ratio of the higher pressure gas to the lower pressure gas. In some examples, control circuitry 122 is configured to receive a signal (e.g., an electrical signal or an optical signal) indicative of a fluid parameter of the supply gas (e.g., a pressure, temperature, and/or flow rate) from a sensor 124 and compare the indicated fluid parameter to a system setpoint. Control circuitry 122 may be configured to receive the signal via a communication link (e.g., communication link 123 (FIG. 2)). Control circuitry 122 may be configured to cause jet pump assembly 110 to operate in the first mode, the second mode, or the third mode, and/or to alter a mixing ratio (e.g., in the second mode), based on the comparison of the fluid parameter indicated by sensor 124 and the system setpoint. Sensor 124 may be configured to monitor the fluid parameter of the supply gas within any portion of bleed system 100 and/or turbine engine 102 (e.g., within supply conduit 120, within LP conduit 116, within HP conduit 118, and/or within another portion of bleed system 100 and/or turbine engine 102).

For example, if the fluid parameter indicated by sensor 124 is less than a system setpoint, then control circuitry 122 may cause jet pump assembly 110 to alter the mixing ratio or to operate in the third mode such that the fluid parameter within supply conduit 120 increases to substantially match (e.g., match or get closer to, such as within 1%-10% of) the system setpoint. If the fluid parameter indicated by sensor 124 is greater than a system setpoint, then control circuitry 122 may cause jet pump assembly 110 to alter the mixing ratio or operate in the first mode such that the fluid parameter within supply conduit 120 decreases to substantially match the system setpoint. In examples, the system setpoint is defined by a range of values around a central setpoint value, and the fluid parameter within supply conduit 120 substantially matches the system setpoint when the fluid parameter is within the range of values. In examples, control circuitry 122 is configured to transmit a control signal to cause jet pump assembly 110 to alter the mixing ratio (e.g., via a communication link 125).

In examples, when jet pump assembly 110 operates in the first mode, jet pump assembly 110 is configured to fluidically isolate HP conduit 118 and supply conduit 120, such that the supply gas provided to gas loads 108 is largely comprised of the lower pressure gas provided by HP conduit 118. Control circuitry 122 may be configured to cause jet pump assembly 110 to operate in the first mode when a pressure of the lower pressure gas is sufficient to service gas loads 108 (e.g., when the pressure of the lower pressure gas is sufficient to supply gas loads 108 based on the system setpoint). For example, control circuitry 122 may be configured to cause jet pump assembly 110 to fluidically isolate HP conduit 118 and supply conduit 120 using needle body 230 and inner nozzle 216 (FIGS. 3-5) of jet pump assembly 110.

In examples, control circuitry 122 is configured to cause jet pump assembly 110 to fluidically isolate HP conduit 118 and supply conduit 120 by engaging needle body 230 and a nozzle outlet 218 of inner nozzle 216 (e.g., to cause jet pump assembly 110 to place needle body 230 in a first position (FIG. 3)). Thus, jet pump assembly 110 may be configured to limit and/or substantially avoid the use of the higher pressure gas when turbine engine 102 operates under greater load (e.g., during an ascent phase of an aircraft and/or higher engine throttle) and the lower pressure gas provides sufficient pressure for the operation of gas loads 108. Hence, jet pump assembly 110 may be configured to limit and/or substantially avoid the use of the higher pressure gas extracted from higher pressure stages of turbine engine 102, thereby limiting and/or mitigating negative impacts on the achievable fuel efficiency of turbine engine 102 (e.g., thereby increasing the fuel efficiency of turbine engine 102).

In the second mode, jet pump assembly 110 is configured to mix the higher pressure gas of HP conduit 118 and the lower pressure gas of LP conduit 116, such that the supply gas within supply conduit 120 is a mixture of the higher pressure gas and the lower pressure gas. Control circuitry 122 and/or jet pump assembly 110 may be configured to alter a mixing ratio of the higher pressure gas and the lower pressure gas based on a comparison of the fluid parameter of the supply gas (e.g., provided by sensor 124) and the system setpoint. For example, control circuitry 122 and/or jet pump assembly 110 may be configured to such that jet pump assembly 110 increases the flow of the higher pressure gas from HP conduit 118 and decreases the flow of the lower pressure gas from LP conduit 116 to increase a pressure of supply gas in supply conduit 120, based on the comparison of the fluid parameter of the supply gas and the system setpoint. Control circuitry 122 and/or jet pump assembly 110 may be configured such that jet pump assembly 110 decreases the flow of the higher pressure gas from HP conduit 118 and increases the flow of the lower pressure gas from LP conduit 116 to decrease the pressure of supply gas in supply conduit 120, based on the comparison of the fluid parameter of the supply gas and the system setpoint.

Figure 4:
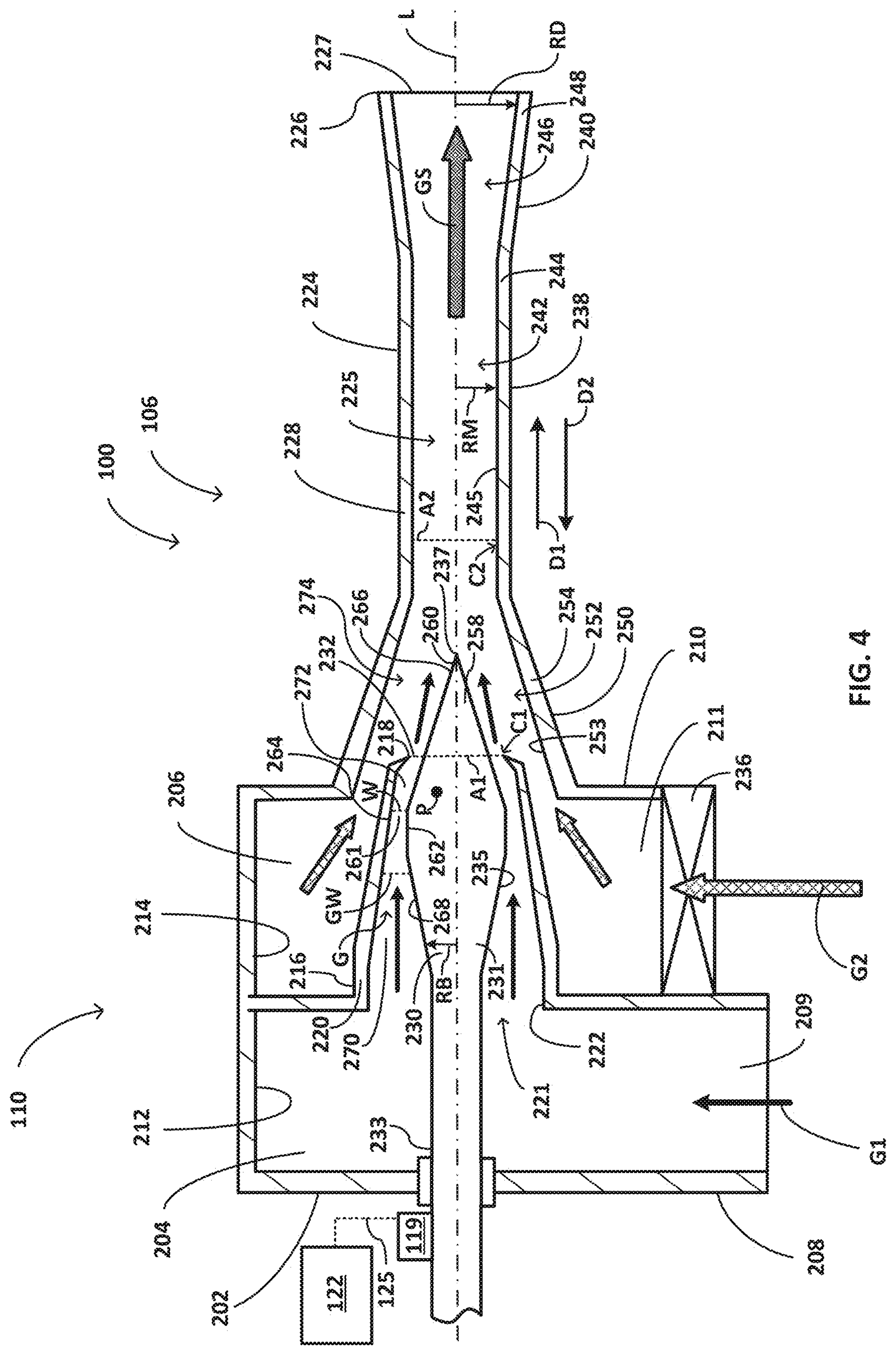
FIG. 4 is a schematic cross-sectional view of the jet pump assembly of FIG. 3 operating in a second mode, the cross-section taken with a cutting plane parallel to the page.

In examples, jet pump assembly 110 is configured to translate needle body 230 of jet pump assembly 110 to alter the mixing ratio of the higher pressure gas and the lower pressure gas. For example (e.g., in the second mode), jet pump assembly 110 may be configured to position needle body 230 in one of a plurality of second positions (FIG. 4). Jet pump assembly 110 may be configured such that, when needle body 230 is positioned in one of a plurality of second positions, needle body 230 and nozzle outlet 218 are displaced such that the higher pressure gas may discharge from inner nozzle 216, and the supply gas (e.g., supply gas GS (FIG. 2) is comprises of a mixture of the higher pressure gas received via HP conduit 118 and the lower pressure gas received via LP conduit 116.

Jet pump assembly 110 may be configured to decrease or increase the flow of the higher pressure gas relative to the flow of the lower pressure gas by altering the displacement between needle body 230 and nozzle outlet 218. For example, jet pump assembly 110 may be configured translate needle body 230 from an initial second position to a subsequent second position to increase a displacement between needle body 230 and nozzle outlet 218 and increase the flow of the higher pressure gas. Jet pump assembly 110 may be configured translate needle body 230 from the initial second position or the subsequent second position to an additional second position to decrease a displacement between needle body 230 and nozzle outlet 218 and decrease the flow of the higher pressure gas.

In the third mode, control circuitry 122 may be configured to cause jet pump assembly 110 to operate such that supply gas 120 is largely comprised of the higher pressure gas provided via HP conduit 118, rather than a substantial mixture of lower pressure gas provided via LP conduit 116 and higher pressure gas provided via LP conduit 118. For example, control circuitry 122 may be configured to cause jet pump assembly 110 to operate in the third mode when turbine engine 102 operates under a lesser load and the lower pressure gas has insufficient pressure to contribute to the operation of gas loads 108.

In examples, control circuitry 122 is configured to cause jet pump assembly 110 to displace needle body 230 from nozzle outlet 218 (e.g., cause jet pump assembly 110 to place needle body 230 in a third position (FIG. 5)) such that the higher pressure gas discharging from inner nozzle 216 has a pressure greater than the lower pressure air within LP conduit 116. For example, jet pump assembly 110 may be configured such, in the third mode (and, e.g., during a typical operating condition of turbine engine 102), the higher pressure air discharging from inner nozzle 216 substantially produces a backpressure in jet pump assembly 110 limiting and/or substantially preventing jet pump assembly 110 from receiving lower pressure air via LP conduit 116. Hence, jet pump assembly 110 may be configured to operate such that supply gas 120 is largely comprised (e.g., substantially entirely comprised) of the higher pressure gas provided via HP conduit 118 when, for example, the lower pressure gas provided by turbine 102 has insufficient pressure to contribute to the operation of gas loads 108.

Further, in the third mode, system 100 and/or jet pump assembly 110 may be configured to fluidically isolate the lower pressure gas of LP conduit 116 and supply conduit 120, such that the supply gas provided to gas loads 108 is largely comprised of the higher pressure gas alone (e.g., when turbine engine 102 operates under a lesser load and the lower pressure gas has insufficient pressure to contribute to the operation of gas loads 108). For example, system 100 and/or jet pump assembly 110 may include a valve 148 (e.g., a check valve) configured to allow flow in a flow direction from LP conduit 116 to jet pump assembly 110 but substantially limit and/or prevent flow in a flow direction from jet pump assembly 110 to LP conduit 116. System 100 and/or jet pump assembly 110 may be configured to substantially limit and/or prevent a flow in a flow direction from jet pump assembly 110 to LP conduit 116 such that, particularly in the third mode, the higher pressure gas provided via HP conduit 118 is limited and/or substantially prevented from flowing from jet pump assembly 110, into LP conduit 116, and into turbine engine 102. Limiting the flow via LP conduit 116 into turbine engine 102 may substantially limit and/or prevent recirculation and recompression of at least some portion of the higher pressure gas provided to jet pump assembly 110 by turbine engine 102 to, for example, limit negative impacts on the achievable fuel efficiency of turbine engine 102 (e.g., to increase the fuel efficiency of turbine engine 102).

As used herein, when a jet pump assembly receives a lower pressure gas and a higher pressure gas and issues a supply gas largely comprised of the lower pressure gas (e.g., when the jet pump assembly operates in the first mode), this may mean the higher pressure gas comprises less than 10% of the supply gas in some examples, less than 5% of the supply gas in some examples, and/or less than 1% of the supply gas in some examples. When the jet pump assembly receives the lower pressure gas and the higher pressure gas and issues the supply gas largely comprised of the higher pressure gas (e.g., when the jet pump assembly operates in the third mode), this may mean the lower pressure gas comprises less than 10% of the supply gas in some examples, less than 5% of the supply gas in some examples, and/or less than 1% of the supply gas in some examples.

Figure 5:
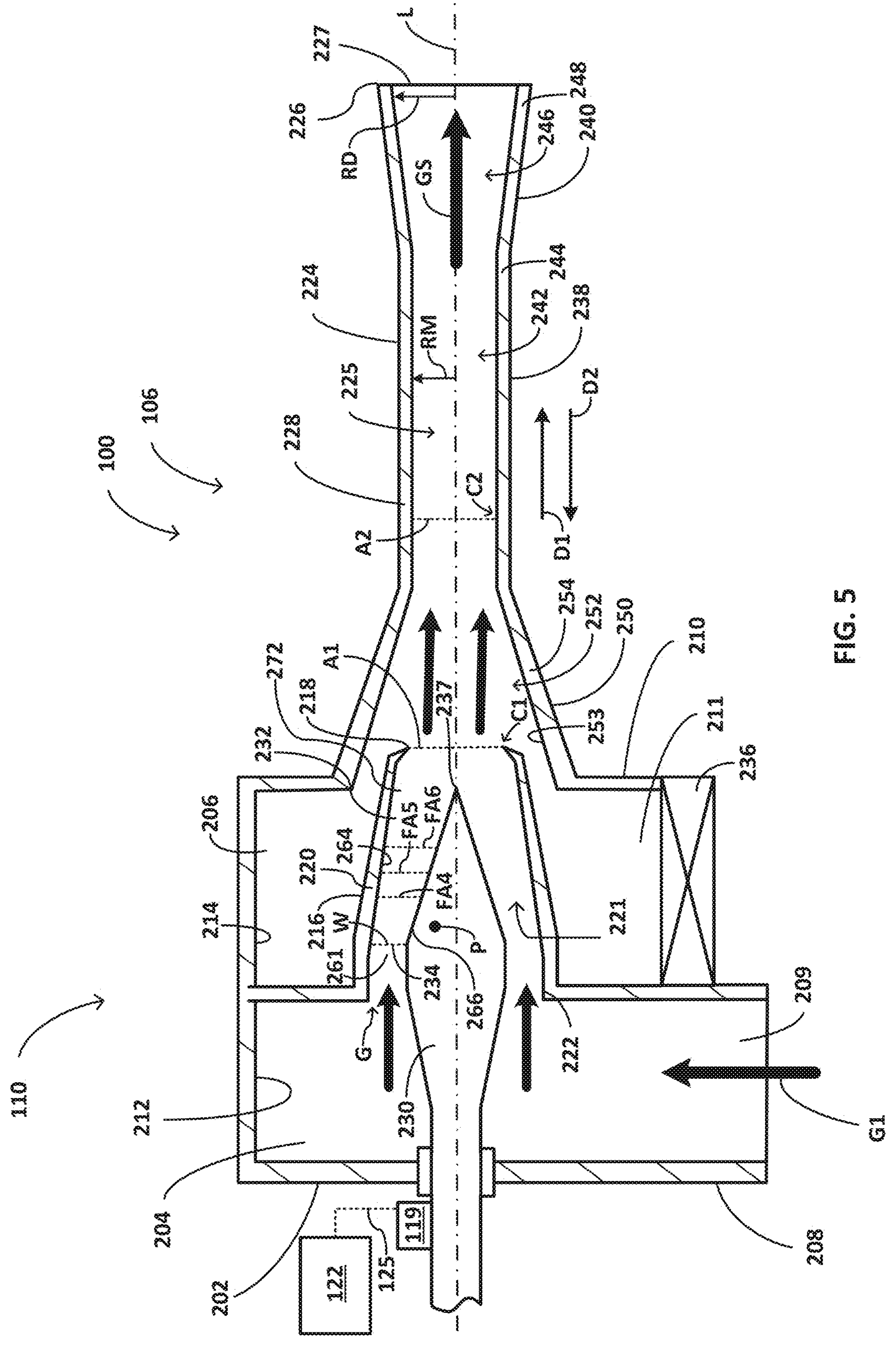
FIG. 5 is a schematic cross-sectional view of the jet pump assembly of FIG. 3 and FIG. 4 operating in a third mode, the cross-section taken with a cutting plane parallel to the page.

In some examples, jet pump system 106 includes a device 119 (FIG. 2) configured to cause jet pump assembly 110 to operate in the first mode, the second mode, or the third mode, and/or to alter the mixing ratio. In examples, device 119 is configured to receive the control signal from control circuitry 122 (e.g., via communication link 125). Device 119 may be configured to cause jet pump assembly 110 to operate in the first mode, the second mode, or the third mode, and/or to alter the mixing ratio based on the control signal. Control circuitry 122 and/or device 119 may be configured to cause jet pump assembly 110 to operate in any of the first mode, the second mode, or the third mode. Control circuitry 122 and/or device 119 may be configured to cause jet pump assembly 110 to position needle body 230 in the first position (FIG. 3), any of the plurality of second positions (FIG. 4), and in the third position (FIG. 5).

Control circuitry 122 may be configured to determine the system setpoint for bleed system 100. In examples, control circuitry 122 is configured to determine the system setpoint based on which of gas loads 108 may be in operation and/or anticipated to be in operation. For example, bleed system 100 and/or gas loads 108 may be configured such that the demand for supply gas by a first gas load (e.g., ECS 136) is satisfied by a first value of the fluid parameter (e.g., satisfied by a first pressure). Bleed system 100 and/or gas loads 108 may be configured such that the demand for supply gas by a second gas load (e.g., fuel tank system 138) is satisfied by a second value of the fluid parameter (e.g., satisfied by a second pressure). The first value may be different from the second value. Similarly, a third gas load (e.g., ADU 140) may require a third value different from the first value and/or the second value, and a fourth gas load (e.g., anti-icing system 142) may require a fourth value different from the first value, the second value, and/or the third value. Similarly, different operating combinations among the first gas load, the second gas load, the third gas load, and/or the fourth gas load may require differing values of the fluid parameter to satisfy the combined gas demand of the operating gas loads.

Control circuitry 122 may be configured to determine the system setpoint for bleed system 100 using any suitable technique. In some examples, the system setpoint is determined by other control circuitry and transmitted to control circuitry 122. In addition or instead, in some examples, control circuitry 122 is configured to establish the system setpoint for bleed system 100. For example, control circuitry 122 may be configured to establish the system setpoint based on an operating status of one or more of gas loads 108. In examples, control circuitry 122 is configured to receive a load signal indicative of an operating status of the one or more of gas loads 108 and determine the system setpoint based on the load signal. The load signal may be, for example, a binary on/off signal indicating whether a gas load within gas loads 108 is operating or secured, a signal indicative of an amount of supply gas the gas load within gas loads 108 is using or anticipated to use, or some other signal type indicating use of the supply gas by the gas load within gas loads 108.

In examples, control circuitry 122 is configured to receive a plurality of load signals from a plurality of gas loads within gas loads 108 and establish the system setpoint based on the plurality. For example, control circuitry 122 may be configured to receive a first signal from a first gas load (e.g., ECS 136), a second signal from a second gas load (e.g., fuel tank system 138), a third signal from a third gas load (e.g., ADU 140), and/or a fourth signal from a fourth gas load (e.g., anti-icing system 142). Control circuitry 122 may be configured to ascertain a combination of gas loads currently operating within bleed system 100 based the first signal, the second signal, the third signal, and/or the fourth signal. Control circuitry 122 may be configured to establish the system setpoint based on the ascertained combination. Jet pump assembly 110 may operate in the first mode, the second mode, and/or the third mode to meet the system setpoint established by control circuitry 122, such that jet pump assembly 110 extracts an amount of higher pressure gas from turbine engine 102 based on the combined gas demand of the ascertained combination of gas loads.

Bleed system 100 may include additional valves, sensors, and other equipment at various locations within bleed system 100. For example, bleed system 100 may include one or more isolation valves configured to fluidically isolate jet pump assembly 110 and LP conduit 16, HP conduit 118, and/or supply conduit 120. Bleed system 100 may include a mid-pressure valve 152 ("MPV") and/or over pressure shut off valve 154 ("OPSOV") configured to allow a flow of supply gas in supply conduit 120, a fan air valve 156 ("FAV") configured to allow a flow of gas (e.g., air) from turbine engine fan section 112 via conduit 128 to PCL 126, starter valve 158 configured to allow a flow of supply gas to turbine engine 102, flow control valve 160 ("FCV") configured to control a flow of the supply gas to ECS 136, and valve 162, valve 164, valve 166, and valve 167 configured to control a flow of supply gas to fuel tank system 138, ADU 140, anti-icing system 142, and pneumatic system 141 respectively.

Bleed system 100 may include one or more of a bleed temperature sensor 168 ("TB") and/or a manifold temperature sensor 170 ("TM") configured to sense a temperature of the supply gas in supply conduit 120, and a first manifold pressure sensor 172 ("PM1") and/or a second manifold pressure sensor 174 ("PM2") configured to sense a pressure of the supply gas in supply conduit 120. Bleed system 100 may include other valves, sensors, and/or control equipment configured to control a flow of gas through bleed system 100.

Control circuitry 122 may be configured cause operation of jet pump assembly 110 based on a comparison of a fluid parameter within bleed system 100 and/or turbine engine 102 and a system setpoint. In some examples, control circuitry 122 is configured to receive the system setpoint via a communication link 176. In some examples, control circuitry 122 may be configured to establish a system setpoint based on one or more load signals indicative of an operating status and/or anticipated gas demand of one or more gas loads 108 within bleed system 100. Control circuitry 122 may be configured to receive a first load signal indicative of (e.g., which changes as a function of) the quantity of the air packs operating or anticipated to operate within ECS 136 via communication link 178. Control circuitry 122 may be configured to receive a second load signal indicative of a demand for fuel tank pressurization by fuel tank system 138 via communication link 180. Control circuitry 122 may be configured to receive a third load signal indicative of a demand by ADU 140 to substantially maintain hydraulic system pressure as control surfaces and/or landing gear are operated via communication link 182. Control circuitry 122 may be configured to receive a fourth load signal indicative of a demand for anti-icing by anti-icing system 142 via communication link 184. In examples, control circuitry 122 is configured to receive one or more additional load signals indicative of a demand for supply gas by pneumatic system 141 via communication link 185. Control circuitry 122 may establish the system setpoint for bleed system 100 based on the load signals received, in order to minimize and/or eliminate an extraction of higher pressure air from turbine engine 102 in excess of that required for satisfactory operation of the gas loads 108. In some examples, control circuitry 122 is configured to receive a system setpoint via communication link 176.

In examples, bleed system 100 and/or gas loads 108 may be configured such that the individual demand for supply gas from an individual gas load is satisfied by a value of the fluid parameter within supply conduit 120 different from a value of the fluid parameter required by one or more other gas loads within gas loads 108. For example, bleed system 100 and/or gas loads 108 may be configured such that the demand for supply gas from a first gas load (e.g., ECS 136) is satisfied by a first value of the fluid parameter of the supply gas within supply conduit 120 (e.g., satisfied by a first pressure). Bleed system 100 and/or gas loads 108 may be configured such that the demand for supply gas from a second gas load (e.g., tank system 138) is satisfied by a second value of the fluid parameter within supply conduit 120 (e.g., satisfied by a second pressure). The first value may be different from the second value. Similarly, a third gas load (e.g., ADU 140) may require a third value different from the first value and/or the second value, and a fourth gas load (e.g., anti-icing system 142) may require a fourth value different from the first value, the second value, and/or the third value. Similarly, different operating combinations among the first gas load, the second gas load, the third gas load, and/or the fourth gas load may require differing values of the fluid parameter within supply conduit 120 to satisfy the combined gas demand of the operating gas loads. Hence, providing a supply gas based on a single, unvarying system setpoint may result in extracting more higher pressure gas from turbine engine 102 than might actually be required based on the combined gas demand of the operating gas loads. This excess use of the higher pressure gas may reduce the fuel efficiency (e.g., may increase the thrust-specific fuel consumption (TFSC)) achieved during operation of turbine engine 102.

Control circuitry 122 may be configured to interpret any load signals (e.g., load signals received via communication links 178, 180, 182, 184, 185) representing a demand for supply gas (e.g., supply gas GS (FIGS. 3-5)) from one or more of gas loads 108. For example, control circuitry 122 may be configured to interpret a load signal as indicative of whether a gas load is in an operating state consuming and/or anticipated to consume supply gas, or in a secured state wherein a supply gas demand from the load is substantially negligible and/or absent. Control circuitry 122 may be configured to interpret a load signal as indicative of a specific and/or anticipated operating configuration of a gas load, such as a number of subsystems (e.g., air packs within ECS 136) operating/ and/or anticipated to operate in the gas load. Control circuitry 122 may be configured to receive a load signal from one or more subsystems within an air load configured to operate when the gas load consumes the supply gas. In examples, control circuitry 122 is configured to interpret load signals indicating a quantity of supply gas consumed by an air load. For example, a portion of bleed system 100 such as a portion including flow control valve 160, valve 162, valve 164, valve 166, or valve 167 may be configured to sense a mass flow or other parameter of supply gas flowing through the bleed system portion and provide a load signal to control circuitry 122 based on the mass flow or other parameter. In examples, one or more of gas loads 108 are configured to sense a mass flow or other parameter of the supply gas and provide the load signal to control circuitry 122 based on the mass flow or other parameter.

Sensor 124 may be configured to sense the fluid parameter of the supply gas at any suitable location within bleed system 100. In some examples, sensor 124 is configured to sense the fluid parameter at a location within bleed system 100 downstream of jet pump system 106 and upstream of the one or more gas loads 108. For example, sensor 124 may be configured to sense the fluid parameter downstream of jet pump system 106 and upstream of PCL 126. Here, "downstream" connotes a flow direction of a supply gas from jet pump system 106 and to the one or more gas loads 108 and/or PCL 126. "Upstream" connotes a flow direction opposite the downstream direction. Sensor 124 may be located upstream or downstream of other sensors and or components within bleed system 100, such as valve 148, mid-pressure valve 152, over pressure shutoff valve 154, fan air valve 156, flow control valve 160, valve 162, valve 164, valve 166, valve 167, starter valve 158, bleed temperature sensor 168, manifold temperature sensor 170, first manifold pressure sensor 172, and/or second manifold pressure sensor 174.

A gas load (e.g., one or more of the gas loads 108) may be configured to generate the load signal based on the demand and/or anticipated demand for the supply gas by the gas load. The gas load may be configured to transmit the load signal to control circuitry 122. In examples, some portion of or substantially all of control circuitry 122 may be housed and/or mechanically supported within a controller housing configured to be located adjacent to jet pump assembly 110 or another portion of bleed system 100. In some examples, control circuitry 122 is housed and/or mechanically supported by housings of one or more of gas loads 108 and/or one or more other housings within aircraft 104.

In some examples, control circuitry 122 is configured to receive signals indicative of a fluid parameter from additional sensors within bleed system 100 in addition to sensor 124. For example, control circuitry 122 may be configured to receive one or more signals indicative of a fluid parameter from bleed temperature sensor 168, first manifold pressure sensor 172, manifold temperature sensor 170, second manifold pressure sensor 174, and other sensors configured to sense a fluid parameter of the supply gas within bleed system 100. The additional sensors may be configured to sense the same type of fluid parameter as sensor 124, or may be configured to sense a type of fluid parameter different from that sensed by sensor 124. For example, control circuitry 122 may be configured to receive a first signal from sensor 124 indicative of a pressure of the supply gas and receive one or more additional signals indicative of a temperature, flow rate, or other fluid parameter of the supply gas. In these examples, control circuitry 122 is configured to cause jet pump assembly 110 to alter a mixing ratio of the higher pressure gas received via HP conduit 118 and the lower pressure gas received via LP conduit 116 based on the first signal and the one or more additional signals.

In some examples, instead of or in addition to the signal communicated via communication link 123, bleed system 100 may be configured to provide a pneumatic and/or hydraulic feedback to jet pump assembly 110 to cause jet pump assembly 110 to alter the mixing ratio. Bleed system 100 may be configured to substantially sense a parameter of the supply gas at a location in bleed system 100 and provide the pneumatic and/or hydraulic feedback to jet pump assembly 110 and/or another component of bleed system 100 using feedback line 111 to cause jet pump assembly 110 to alter the mixing ratio. In examples, feedback line 111 is a pneumatic feedback line configured to substantially port a portion of the supply gas to jet pump assembly 110 and/or another component of bleed system 100. Feedback line 111 may sense the supply gas at any location within bleed system 100. In some examples, feedback line 111 is configured to sense the parameter of the supply gas at a location substantially defined by a diffuser portion of a jet pump assembly (e.g., diffuser portion 240).

Turbine engine 102 may be configured to receive a gas (e.g., air) from turbine engine fan section 112 and progressively increase the pressure of the gas through a series of successive compressor stages. Turbine engine 102 may be configured such that a first compressor stage compresses the gas to a first pressure, a second compressor stage receives the gas from the first compressor stage and increases the pressure to a second pressure greater than the first pressure, a third compressor stage receives the gas from the second compressor stage and increases the pressure to a third pressure greater than the second pressure, and so on until turbine engine 102 issues the gas from a final compressor stage to combustion section 114. In some examples, bleed system 100 is configured to extract higher pressure gas via HP conduit 118 from a compressor stage outside of the last 20% of the compressor stages of turbine engine 102. For example, turbine engine 102 may include a plurality of compressor stages designated one through ten, with the tenth compressor stage configured to issue compressed gas to combustion section 114, such that the 20% of the compressor stages includes compressor stage nine and compressor stage ten.

In some examples, turbine engine 102 is configured to increase a pressure of a gas stream as the gas stream flows from a lower pressure stage to a penultimate compressor stage to a final compressor stage, wherein the penultimate compressor stage is configured to issue the compressed gas to the final compressor stage and the final compressor stage is configured to issue the compressed gas to combustion section 114. Bleed system 100 may be configured to provide the higher pressure gas via HP conduit 118 from the gas stream prior to the gas stream flowing to one of the penultimate compressor stage or the final pressure stage.

Figure 3:
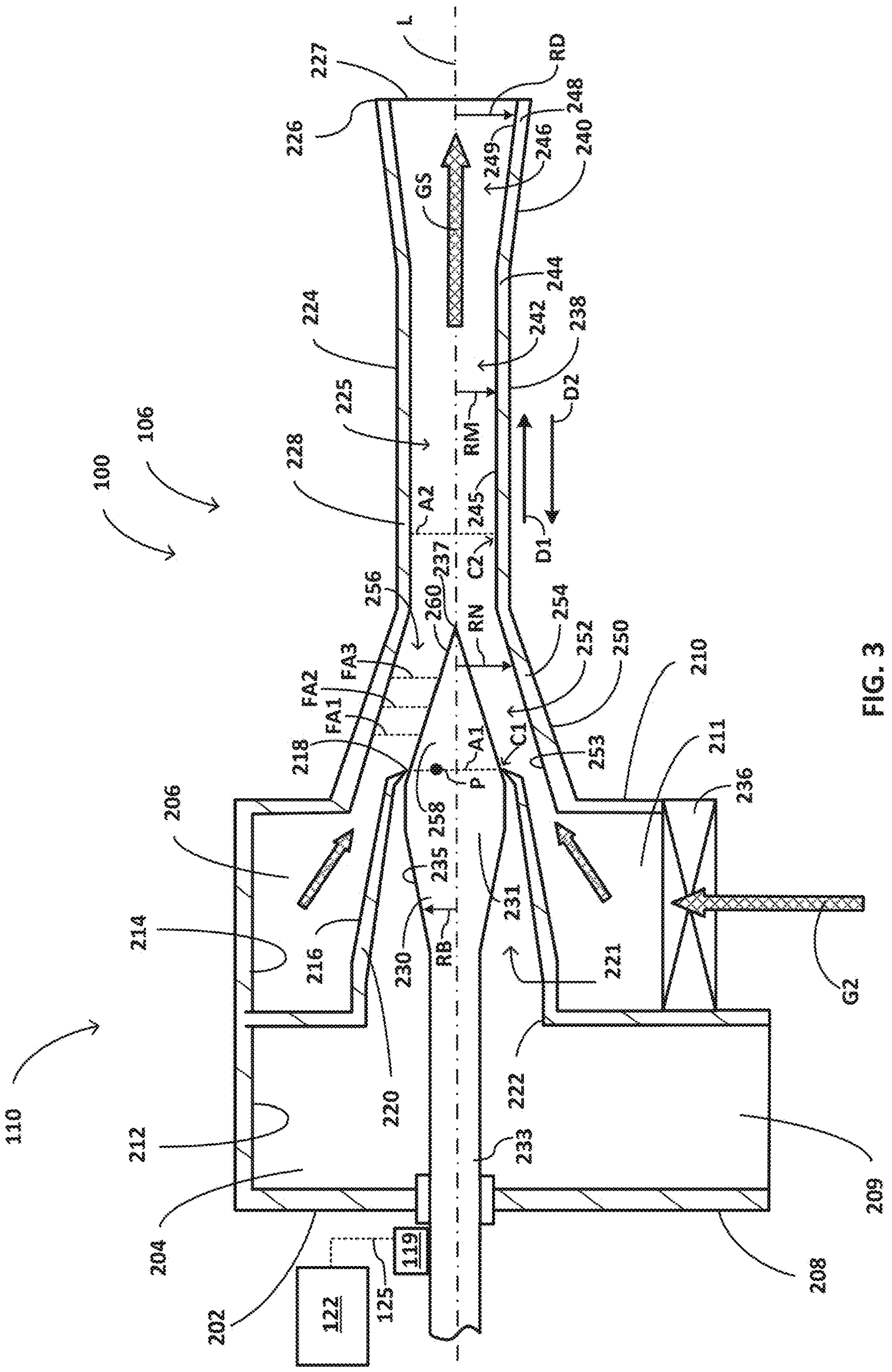
FIG. 3 is a schematic cross-sectional view of a jet pump assembly operating in a first mode, the cross-section taken with a cutting plane parallel to the page.

FIG. 3 is a schematic illustration jet pump system 106 with jet pump assembly 110 operating in a first mode. FIG. 4 is a schematic illustration of jet pump assembly 110 operating in a second mode. FIG. 5 is a schematic illustration of jet pump assembly 110 operating in a third mode. In FIG. 3, FIG. 4, and FIG. 5, portions of jet pump assembly 110 are illustrated in cross-section, with the cutting plane taken parallel to the page. Although FIGS. 3-5 and the following discussions thereof illustrate jet pump system 106 with a single jet pump (e.g., jet pump assembly 110) for illustration, in other examples (e.g., FIG. 6), jet pump system 106 may include a plurality of jet pumps configured to provide a supply gas.

Jet pump assembly 110 includes a housing 202 defining a high pressure chamber 204 ("HP chamber 204") and a suction chamber 206. Jet pump assembly 110 is configured to receive a first gas flow G1 (e.g., higher pressure gas from HP conduit 118 (FIGS. 1, 2)) within HP chamber 204. First gas flow G1 is depicted with black arrows in FIG. 4 and FIG. 5. Jet pump assembly 110 is configured to receive a second gas flow G2 (e.g., lower pressure gas via LP conduit 116 (FIGS. 1, 2)) within suction chamber 206. Second gas flow G2 is depicted with cross-hatched arrows in FIG. 3 and FIG. 4. In examples, housing 202 includes a first inlet 208 defining a first inlet opening 209 fluidically coupled to HP chamber 204. Housing 202 may include a second inlet 210 defining a second inlet opening 211 fluidically coupled to suction chamber 206. In examples, first inlet 208 is configured to couple to (e.g., mechanically engage) HP conduit 118 and/or second inlet 210 is configured to couple to (e.g., mechanically engage) LP conduit 116. In examples, HP chamber 204 is a first volume bounded by an HP chamber boundary 212 defined at least in part by housing 202. Suction chamber 206 may be second volume bounded by a suction chamber boundary 214 defined at least in part by housing 202.

Jet pump assembly 110 is configured to operate in at least first mode (FIG. 3), a second mode (FIG. 4), and a third mode (FIG. 5). In the first mode (FIG. 3), jet pump assembly 110 is configured such that reception of first gas flow G1 is substantially limited, and a supply gas GS is largely comprised of second gas flow G2. In the second mode, jet pump assembly 110 is configured to receive both first gas flow G1 and second gas flow G2 and supply gas GS is largely comprised of a mixture of first gas flow G1 and second gas flow G2. In the third mode, jet pump assembly 110 is configured such that reception of second gas flow G2 is substantially avoided, and supply gas GS is largely comprised of first gas flow G1. Jet pump assembly 110 may be configured to discharge supply gas GS (e.g., to supply conduit 120 (FIGS. 1, 2) via an exhaust portion 224.

For example, jet pump assembly 110 may operate in the first mode (FIG. 3) when second gas flow G2 provides sufficient pressure for the operation of gas loads 108 (e.g., when turbine engine 102 is operating under greater load, such as during an ascent phase of an aircraft and/or higher engine throttle). Jet pump assembly 110 may operate in the second mode (FIG. 4) when a mixture of first gas flow G1 and second gas flow G2 is necessary for the operation of gas loads 108. Jet pump assembly 110 may operate in the third mode (FIG. 5) under conditions when the provision of first gas flow G1 alone (e.g., without second gas flow G2) is desired for the operation of gas loads 108 (e.g., when turbine engine 102 is operating under lesser load, such as during a descent phase of an aircraft and/or lower engine throttle). Control circuitry 122 may be configured to cause jet pump assembly 110 to operate in any one of the first mode, the second mode, or the third mode.

In the first mode (FIG. 3), a needle body 230 engages a nozzle outlet 218 of an inner nozzle 216 to fluidically isolate HP chamber 204 and an exhaust portion 224 of jet pump assembly 110 such that, for example, extraction of first gas flow G1 (e.g., from a higher pressure stage of turbine engine 102) is substantially avoided and supply gas GS is largely comprised of second gas flow G2 (e.g., extracted from a lower pressure stage of turbine engine 102). In examples, jet pump assembly 110 is configured to operate in the first mode when needle body 230 is positioned in a first position (e.g., when control circuitry 122 causes needle body 230 to position in the first position). Jet pump assembly 110 may be configured such that needle body 230 engages a nozzle outlet 218 when needle body 230 positions in the first position. In examples, jet pump assembly 110 is configured to fluidically isolate first gas flow G1 and second gas flow G2 (e.g., fluidically isolate first inlet 208 and second inlet 210, and/or fluidically isolate first inlet 208 and exhaust portion 224) when needle body 230 is in the first position.

Hence, jet pump assembly 110 may be configured such that, in the first mode, reception of first gas flow G1 by limited and supply gas GS is largely comprised of second gas flow G2.

In the second mode (FIG. 4), jet pump assembly 110 is configured to receive both first gas flow G1 and second gas flow G2 and supply gas GS is a mixture of first gas flow G1 and second gas flow G2. When jet pump assembly 110 operates in the second mode, needle body 230 is disengaged from nozzle outlet 218 such that HP chamber 204 and exhaust portion 224 are fluidically coupled through a nozzle flow area 232 defined between a nozzle wall 220 of inner nozzle 216 and needle body 230. In the second mode, jet pump assembly 110 may be configured to accelerate first gas flow G1 between HP chamber 204 and nozzle flow area 232 to reduce the pressure of first gas flow G1 discharging via nozzle flow area 232, such that the reduced pressure allows second gas flow G2 to enter suction chamber 206 and/or suction nozzle volume 252 via second inlet 210.

Jet pump assembly 110 is configured to translate needle body 230 to alter a mixing ratio of first gas G1 and second gas G2. Jet pump assembly 110 may be configured to alter the mixing ratio (e.g., to change a pressure of gas supply GS) by increasing or decreasing the flow of first gas G1 discharging through nozzle outlet 218 relative to the flow of second gas G2 entering suction chamber 212 by translating needle body 230 to alter a size of nozzle flow area 232. For example, jet pump assembly 110 may be configured to translate needle body 230 toward nozzle outlet 218 (e.g., in a first direction D1) to decrease a size of nozzle flow area 232 and decrease the flow of first gas G1 relative to the flow of second gas G2. Jet pump assembly 110 may be configured to translate needle body 230 away from nozzle outlet 218 (e.g., in a second direction D2) to increase a size of nozzle flow area 232 and increase the flow of first gas G1 relative to the flow of second gas G2. In examples, jet pump assembly 110 is configured to translate needle body 230 relative to nozzle outlet 218 based on a pressure of supply gas GS (e.g., as compared to the system setpoint).

Jet pump assembly 110 may be configured to establish needle body 230 at any one of a plurality of second positions relative to nozzle outlet, with each second position defining a different displacement between needle body 230 and nozzle flow area 232, and/or with each second position defining a different size (e.g., a different area) of nozzle flow area. Jet pump assembly 110 may be configured to alter the flow of first gas G1 relative to the flow of second gas G2 by establishing needle body 230 at different second positions. For example, jet pump assembly 110 may be configured to translate needle body 230 in the direction D2 from an initial second position to a subsequent second position to increase the flow of first gas G1 relative to second gas G2 (e.g., to increase a pressure of supply gas GS). Jet pump assembly 110 may be configured to translate needle body 230 in the direction D1 from the initial second position or the subsequent second position to an additional second position to decrease the flow of first gas G1 relative to second gas G2 (e.g., to decrease a pressure of supply gas GS).

Hence, jet pump assembly 110 may be configured such that, in the second mode, supply gas GS is a mixture of first gas flow G1 and second gas flow G2. Jet pump assembly 110 may be configured to control a pressure of supply gas GS by increasing or decreasing the flow of first gas G1 relative to the flow of second gas G2.

In the third mode (FIG. 5), jet pump assembly 110 is configured such that reception of second gas flow G2 is substantially limited, and supply gas GS is largely comprised of first gas flow G1. Jet pump system 106 (e.g., control circuitry 122 and/or jet pump assembly 110) may be configured to position needle body 230 in a third position to cause jet pump assembly 110 to operate in the third mode. When jet pump assembly 110 operates in the third mode, needle body 230 positions relative to nozzle outlet 218 such that a pressure reduction of first gas flow G1 is minimized and/or otherwise limited as first gas flow G1 flows between HP chamber 204 and nozzle flow area 232. Minimizing and/or otherwise limiting the pressure reduction may act to cause an increase in the pressure of first gas flow G1 discharging via nozzle flow area 232. The increased pressure of first gas flow G1 discharging through nozzle flow area 232 may limit and/or otherwise prevent the entry of second gas flow G2 into suction chamber 206, such that supply gas GS is largely comprised of first gas flow G1 with minimal or no contribution from second gas flow G2. In examples, the increased pressure of first gas flow G1 discharging through nozzle flow area 232 substantially generates a backpressure in suction chamber 206 which limits and/or otherwise prevents the entry of second gas flow G2 into suction chamber 206.

In examples, air bleed system 100 and/or jet pump assembly 110 includes a valve 236 (e.g., a check valve, such as valve 148 (FIG. 2)) configured to limit and/or substantially prevent first gas stream G1 from discharging into suction chamber 206 and/or second inlet 210 when supply gas GS is largely comprised of first gas flow G1 (e.g., when the backpressure in suction chamber 206 limits and/or otherwise prevents the entry of second gas flow G2 into suction chamber 206). On some examples, valve 236 is configured to fluidically isolate suction chamber 206 and LP conduit 116 (FIG. 1, 2) when supply gas GS is largely comprised of first gas flow G1.

In examples, jet pump assembly 110 is configured to operate in the third mode when needle body 230 is positioned in a third position (e.g., when control circuitry 122 causes needle body 230 to position in the third position). Jet pump assembly 110 may be configured such that needle body 230 defines a maximum displacement from nozzle outlet 218 when needle body 230 positions in the third position. In examples, the maximum displacement may be greater than any displacements between needle body 230 and nozzle outlet 218 when needle body 230 is in the first position or any one of the second positions. In examples, (e.g., under a typical operating condition of turbine engine 102), jet pump assembly 110 is configured to (e.g., using valve 236) fluidically isolate HP conduit 118 and LP conduit 116, and/or fluidically isolate second inlet 210 and exhaust portion 224, when needle body 230 is in the third position.

Hence, jet pump assembly 110 may be configured such that, in the third mode, supply gas GS is largely comprised of first gas flow G1.

Inner nozzle 216 may define nozzle outlet 218. In examples, inner nozzle 216 is supported by housing 202. Inner nozzle 216 is configured to (e.g., in the second mode (FIG. 4) and/or in the third mode (FIG. 5)) receive first gas flow G1 from HP chamber 204 and discharge first gas flow G1 through nozzle outlet 218. In examples, inner nozzle 216 defines a nozzle volume 221 fluidically coupled to (e.g., opening into) HP chamber 204. In some examples, nozzle wall 220 defines nozzle volume 221 (e.g., defines at least some portion of a boundary of nozzle volume 221). Nozzle volume 221 is fluidically coupled to nozzle outlet 218. In some examples, nozzle wall 220 defines a nozzle inlet 222. Inner nozzle 216 may be configured to receive first gas flow G1 from HP chamber 204 via nozzle inlet 222.

In some examples, nozzle wall 220 defines nozzle outlet 218. Jet pump assembly 110 (e.g., housing 202) may support inner nozzle 216 such that nozzle wall 220 is substantially stationary relative to housing 202. In examples, jet pump assembly 110 (e.g., housing 202) supports inner nozzle 216 such that nozzle wall 220 is substantially stationary relative to HP chamber boundary 212 and/or suction chamber boundary 214. In some examples, longitudinal axis L extends at least through nozzle inlet 222, nozzle volume 221, and/or nozzle outlet 218.

Nozzle wall 220 and/or nozzle outlet 218 may substantially surround (e.g., enclose) longitudinal axis L. For example, nozzle wall 220 and/or nozzle outlet 218 may define a first circumference C1 substantially perpendicular to longitudinal axis L and surrounding longitudinal axis L. First circumference C1 may be comprised of one or more curved segments, one or more linear segments, and/or one or more curvilinear segments. In some examples, first circumference C1 defines a circular shape, an elliptical shape, an oval-shape, or some other shape. In some examples, first circumference C1 defines a regular polygon (e.g., a hexagon, octagon, or other regular polygon) or an irregular polygon.

In examples, nozzle outlet 218 (e.g., first circumference C1) defines a first cross-sectional area A1. Inner nozzle 216 may be configured to cause first gas flow G1 to flow through at least some portion of first cross-sectional area A1 when first gas flow G1 flows from HP chamber 204 and discharges through nozzle outlet 218. In examples (e.g., as depicted in FIG. 3 and FIG. 4), jet pump assembly 110 is configured to extend some portion of a needle body 230 through first cross-sectional area A1. In some examples, first cross-sectional area A1 is substantially perpendicular to longitudinal axis L. In FIG. 3, FIG. 4, and FIG. 5, first cross-sectional area A1 is illustrated with a dashed line. In FIG. 3 and FIG. 4, first cross-sectional area A1 and extends through needle body 230. Jet pump assembly 110 may be configured such that nozzle flow area 232 comprises at least a portion of first cross-sectional area A1 (e.g., as depicted in FIG. 4). In some examples (e.g., when jet pump assembly 110 operates in the second mode or the third mode in some examples), jet pump assembly 110 is configured such that nozzle flow area 232 comprises substantially all of first cross-sectional area A1 (e.g., as depicted in FIG. 5).

In examples, exhaust portion 224 defines an exhaust volume 225. Exhaust volume 225 is configured to receive first gas flow G1 from nozzle outlet 218 and receive second gas flow G2 from suction chamber 206. Exhaust portion 224 is configured to discharge supply gas GS through an exhaust opening 227 defined by an exhaust outlet 226 of exhaust portion 224. In examples, longitudinal axis L extends through exhaust volume 225 and/or exhaust opening 227. In examples, jet pump assembly 110 defines first direction D1 (e.g., a downstream direction) in a direction from nozzle outlet 218 towards exhaust outlet 226. Jet pump assembly 110 may define second direction D2 (e.g., an upstream direction) in a direction from exhaust outlet 226 towards nozzle outlet 218. In examples, first direction D1 and/or second direction are substantially parallel to or coincident with longitudinal axis L. Jet pump assembly 110 may be configured to cause supply gas GS to flow through exhaust volume 225 and towards exhaust opening 227 in the first direction D1. In examples, exhaust portion 224 may be supported by housing 202.

In some examples, a wall 228 of exhaust portion 224 ("exhaust portion wall 228") defines exhaust volume 225 (e.g., defines at least some portion of a boundary of exhaust volume 225). Exhaust portion 224 may be configured such that exhaust volume 225 is fluidically coupled to nozzle volume 221 (e.g., via nozzle outlet 218) and fluidically coupled to suction chamber 206. In examples, exhaust portion 224 is configured such that exhaust volume 225 may be fluidically coupled to supply conduit 120 (e.g., via exhaust outlet 226). In some examples, exhaust portion 224 is configured to couple to (e.g., mechanically engage) supply conduit 120.

Exhaust portion 224 may include a mixing portion 238 and/or a diffuser portion 240. Mixing portion 238 defines a mixing portion volume 242. In examples, mixing portion 238 includes a mixing portion wall 244 defining a boundary of mixing portion volume 242. Mixing portion wall 244 may be a portion of exhaust portion wall 228. In some examples, mixing portion wall 244 surrounds longitudinal axis L. Mixing portion 238 is configured to receive (e.g., within mixing portion volume 242) first gas flow G1 from nozzle outlet 218 and configured to receive (e.g., within mixing portion volume 242) second gas flow G2 from suction chamber 206.

Mixing portion 238 is configured to provide first gas flow G1 and/or second gas flow G2 to diffuser portion 240. Mixing portion 238 is configured such that, when mixing portion 238 receives first gas flow G1 and second gas flow G2, mixing portion 238 may cause mixing of first gas flow G1 and second gas flow G2, such that supply gas GS comprises a mixture of first gas flow G1 and second gas flow G2 (e.g., when jet pump assembly 110 is operating in the second mode). In examples, mixing portion volume 242 is a portion of exhaust volume 225. In examples, mixing portion 238 is configured such that mixing portion volume 242 provides a substantially constant flow area for a fluid (e.g., first gas flow G1, second gas flow G2, or a mixture of first gas flow G1 and second gas flow G2) flowing through mixing portion volume 242 toward diffuser portion 240. In some examples, mixing portion 238 defines a mixing portion radius RM extending from longitudinal axis L to mixing portion wall 244 (e.g., extending to an inner surface 245 defined by mixing portion wall 244). Mixing portion radius RM may be substantially constant over some portion of (e.g., over substantially all of) mixing portion 238. In examples, inner surface 245 faces towards and/or surrounds longitudinal axis L.

In examples, exhaust portion wall 228 (e.g., mixing portion wall 244) defines a second circumference C2 substantially perpendicular to longitudinal axis L and surrounding longitudinal axis L. Second circumference C2 may be some portion of the boundary of mixing portion volume 242. Second circumference C2 may be comprised of one or more curved segments, one or more linear segments, and/or one or more curvilinear segments. In some examples, second circumference C2 defines a circular shape, an elliptical shape, an oval-shape, or some other shape. In some examples, second circumference C2 defines a regular polygon (e.g., a hexagon, octagon, or other regular polygon) or an irregular polygon.

In examples, exhaust portion wall 228 (e.g., mixing portion wall 244) defines a second cross-sectional area A2. In examples, second circumference C2 defines second cross-sectional area A2. Exhaust portion wall 228 may be configured to cause first gas flow G1 and/or second gas flow G2 to flow through at least some portion of second cross-sectional area A2 when exhaust outlet 226 discharges supply gas GS. In some examples, second cross-sectional area A2 is substantially perpendicular to longitudinal axis L. In some examples, second cross-sectional area A2 is substantially parallel to first cross-sectional area A1.

In some examples, mixed portion radius RM defines second cross-sectional area A2. In FIG. 3, FIG. 4, and FIG. 5, second cross-sectional area A2 is illustrated with a dashed line. In examples, first cross-sectional area A1 defines an area which is equal to or greater than at least 80% of second cross-sectional area A2. In some examples, second cross-sectional area A2 is less than or substantially equal to first cross-sectional area A1. For example, in some examples, first cross-sectional area A1 defines an area greater than second cross-sectional area A2 and less than or equal to 1.2 times second cross-sectional area A2. In some examples, first cross-sectional area A1 defines an area greater than second cross-sectional area A2 and less than or equal to 1.5 times second cross-sectional area A2. In some examples, first cross-sectional area A1 defines an area greater than 1.5 times second cross-sectional area A2.

Diffuser portion 240 may define a diffuser portion volume 246. In examples, diffuser portion 240 includes a diffuser portion wall 248 defining a boundary of diffuser portion volume 246. Diffuser portion wall 248 may be a portion of exhaust portion wall 228. In examples, diffuser portion wall 248 surrounds longitudinal axis L. In some examples, diffuser portion wall 248 is coupled to (e.g., mechanically coupled to and/or substantially unitary with) mixing portion wall 244.

Diffuser portion 240 (e.g., diffuser portion wall 248) may define exhaust outlet 226 and/or exhaust opening 227. In examples, diffuser portion volume 246 is a portion of exhaust volume 225. In examples, diffuser portion 240 is configured such that diffuser portion volume 246 provides an increasing flow area for a fluid (e.g., first gas flow G1, second gas flow G2, or a mixture of first gas flow G1 and second gas flow G2) flowing through diffuser portion volume 246 toward exhaust outlet 226. In some examples, diffuser portion 240 defines a diffuser portion radius RD extending from longitudinal axis L to diffuser portion wall 248 (e.g., extending to an inner surface 249 defined by diffuser portion wall 248). Diffuser portion radius RD may increase as diffuser portion 240 (e.g., diffuser portion wall 248) extends from mixing portion 238 to exhaust outlet 226. In examples, inner surface 249 faces towards and/or surrounds longitudinal axis L.

Needle body 230 may be configured to move relative to nozzle wall 220. In examples, needle body 230 is configured to move relative to nozzle wall 220 within nozzle volume 221. In examples, needle body 230 is configured to translate laterally along longitudinal axis L when needle body 230 moves relative to nozzle wall 220 within nozzle volume 221. For example, needle body 230 may be configured to move relative to nozzle wall 220 in the first direction D1 and in the second direction D2. In examples, needle body 230 is configured to move relative to housing 202, HP chamber boundary 212, suction chamber boundary 214, and/or exhaust portion wall 228 when needle body 230 moves relative to nozzle wall 220.

Needle body 230 may be configured to establish the first position, one or more second positions, and the third position. In examples, the one or more second positions are substantially between the first position and the third position (e.g., along longitudinal axis L). Regarding the first position (FIG. 3), needle body 230 may be configured to engage nozzle outlet 218 in the first position. For example, needle body 230 may be configured such that a fixed point P defined by needle body 230 is substantially even with nozzle outlet 218 in the first position. In examples, in the first position, a distance along longitudinal axis L from fixed point P to exhaust outlet 226 may be substantially equal to a distance along longitudinal axis L from nozzle outlet 218 to exhaust outlet 226. In examples, needle body 230 is configured to fluidically isolate HP chamber 204 and/or nozzle volume 221 from at least exhaust volume 225 when needle body 230 is in the first position.

Regarding the one or more of the second positions (FIG. 4), needle body 230 may be configured such that nozzle outlet 218 is between fixed point P and exhaust outlet 226 when needle body 230 is in one or more of the second positions. Jet pump assembly 110 may have any number of the one or more second positions, and jet pump assembly 110 may be configured to position needle body in any of the one or more second positions. Regarding the third position (FIG. 5), needle body 230 may be configured such that fixed point P defines a maximum distance along longitudinal axis L from fixed point P to nozzle outlet 218 when needle body 230 is in the third position.

In examples, needle body 230 is configured to displace in the second direction D2 when needle body 230 transitions from the first position to one of the one or more second positions and/or the third position. Needle body 230 may be configured to displace in the second direction D2 when needle body 230 transitions from one of the one or more second positions to the third position. In examples, needle body 230 is configured to displace in the first direction D1 when needle body 230 transitions from the third position to one of the one or more second positions and/or the first position. Needle body 230 may be configured to displace in the first direction D1 when needle body 230 transitions from one of the one or more second positions to the first position. Needle body 230 may be configured to position in any of the first position, one of the one or more second positions, or the third position, and may be configured to transition between the first position, any of the one or more second positions, and/or the third position. Control circuitry 122 may be configured to cause needle body 230 to position in any of the first position, one of the one or more second positions, or the third position, and may be configured to cause needle body 230 to transition between the first position, any of the one or more second positions, and/or the third position.

In examples, needle body 230 defines a forward end 237 ("needle forward end 237"). In examples, needle forward end 237 defines a maximum extension of needle body 230 in a direction from nozzle inlet 222 toward nozzle outlet 218 (e.g., in first direction D1) when at least some portion of needle body 230 is positioned within nozzle volume 221, and/or when needle body 230 positions in and/or transitions between the first position, one of the one or more second positions, and/or the third position. In examples, needle body 230 is configured such that needle forward end 237 is substantially between nozzle outlet 218 and exhaust outlet 226 when needle body 230 is in the first position. In some examples, needle body 230 may be configured such that needle forward end 237 is substantially between nozzle outlet 218 and exhaust outlet 226 when needle body 230 is in one of the one or more second positions and/or in the third position.

In some examples, needle body 230 includes a body portion 231 and a shaft portion 233. In examples, needle body 230 is configured such that body portion 231 is between needle forward end 237 and shaft portion 233. In examples, body portion 231 defines an outer surface 235 ("needle outer surface 235") extending from needle forward end 237 to at least shaft portion 233. Shaft portion 233 may be coupled to (e.g., mechanically coupled to and/or a unitary component with) body portion 231. In examples, needle body 230 is configured such that body portion 231 engages nozzle outlet 218 when needle body 230 is in the first position. Needle body 230 may be configured such that body portion 231 is disengaged (e.g., displaced in second direction D2) from nozzle outlet 218 when needle body 230 is in one of the one or more second positions of the third position. In examples, longitudinal axis L extends through shaft portion 233 and/or body portion 231.

In some examples, body portion 231 defines a body radius RB extending from longitudinal axis L to needle outer surface 235. Body portion 231 may be configured to cause body radius RB to increase, decrease, or be substantially constant over intervals of needle outer surface 235 between shaft portion 233 and needle forward end 237. In examples, body portion 231 is configured to cause body radius RB to increase as needle outer surface 235 extends from shaft portion 233. Body portion 231 may be configured to cause body radius RB to decrease as needle outer surface 235 extends to needle forward end 237. In examples, needle outer surface 235 defines a maximum body radius between shaft portion 233 and needle forward end 237. Body portion 231 may be configured such that body radius RB increases to the maximum body radius as needle outer surface 235 extends from shaft portion 233 then decreases from the maximum body radius as needle outer surface 235 extends further to needle forward end 237.

In examples, needle outer surface 235 defines a curved profile with respect to longitudinal axis L as needle outer surface 235 extends from shaft portion 233 to needle forward end 237. For example, needle outer surface 235 may define the curved profile in a plane which includes longitudinal axis L. The curved profile may include one or more curved segments defining a curvature (e.g., a convexity) with respect to longitudinal axis L. In examples, a convexity has a positive curvature with respect to a vector normal to and extending from needle outer surface 235 in a direction away from longitudinal axis L. In some examples, the curved profile may include one or more linear segments in addition to or instead of the one or more curved segments. In some examples, portions of needle outer surface 235 may substantially define a surface of some portion of a spheroid (e.g., an oblate spheroid). In some examples, portions of needle outer surface 235 may substantially define a surface of some portion of a conical shape.

In examples, jet pump system 106 includes device 119 configured to cause needle body 230 to transition between the first position, one of the one or more second positions, and/or the third position. Device 119 may be configured to cause needle body 230 to position in the first position, one of the one or more second positions, and/or the third position. In some examples, device 119 is configured to cause and/or impart a force (e.g., a mechanical force, an electromagnetic force, and/or another force) on needle body 230 (e.g., shaft portion 233) to cause needle body 230 to transition between and/or position in the first position, one of the one or more second positions, and/or the third position. For example, device 119 may be configured to exert the force substantially in the first direction D1 and/or in the second direction D2.

Device 119 may be configured to cause and/or impart the force on needle body 230 in any suitable manner. In some examples, device 119 is configured to provide and/or receive a pressurized control fluid (e.g., air, fuel, or hydraulic fluid) to cause and/or impart the force on needle body 230. Device 119 may include, for example, a torque motor configured to provide the pressurized control fluid. In some examples, device 119 includes an electric motor configured to generate a torque and/or linear force to cause and/or impart the force on needle body 230. In some examples, device 119 may include a component (e.g., an electrical coil or other component) configured to generate an electromagnetic field which acts on needle body 230 and/or another portion of jet pump assembly 110 to cause and/or impart the force on needle body 230. In some examples, device 119 may be at least partially supported (e.g., mechanically supported) by housing 202, although this is not required. Device 119 may be at least partially supported (e.g., mechanically supported) by another portion of bleed system 100 and/or jet pump system 106.

Control circuitry 122 may be configured to transmit (e.g., via communication link 125) a control signal to device 119 to cause device 119 to cause and/or impart the force on needle body 230. In some examples, control circuitry 122 is configured to transmit the control signal to device 119 in response to a signal indicative of a fluid parameter received from sensor 124, 172 or 174 (FIG. 2) and/or another sensor of bleed system 100. In some examples, control circuitry 122 is configured to compare the indicative signal to a system setpoint (e.g., a system setpoint received via communication link 176 (FIG. 2)) and transmit the control signal to device 119 via communication link 125 based on the comparison. In some examples, control circuitry 122 is configured to establish the system setpoint based on one or more load signals received via communication links 178, 180, 182, 184, 185 (FIG. 2).

As discussed, in the first mode (FIG. 3), jet pump assembly 110 is configured such that supply gas GS is largely comprised of second gas flow G2. Jet pump assembly 110 (e.g., suction chamber boundary 214 and/or needle body 230) may be configured to limit and/or mitigate pressure loss of second gas flow G2 when second gas flow G2 flows from suction chamber 206 to mixing portion volume 242. In examples, jet pump assembly 110 is configured to limit an expansion of second gas flow G2 flowing from suction chamber 206 to mixing portion volume 242 (e.g., to mitigate pressure loss of second gas flow G2). Limiting and/or mitigating a pressure loss of second gas flow G2 flowing from suction chamber 206 to mixing portion volume 242 may reduce a desired and/or required pressure of second gas flow G2 at second inlet 210 necessary for jet pump assembly 110 to operate in the first mode (e.g., since, in the first mode, second gas flow G2 may be used to service gas loads (e.g., gas loads 108) without contribution from first gas flow G1). This may decrease and/or delay a need to provide first gas flow G1 to jet pump assembly 110 for the service of the gas loads, such that extraction of first gas flow G1 from a higher compression stage of turbine engine 102 (FIG. 1-2) is mitigated.

In examples, housing 202 defines a suction nozzle 250 defining a suction nozzle volume 252. Suction nozzle 250 may be configured such that suction nozzle volume 252 is fluidically coupled to suction chamber 206 and mixing portion volume 242. In examples, suction nozzle 250 is configured such that suction nozzle volume 252 receives second gas flow G2 from suction chamber 206 and provides second gas flow G2 to mixing portion volume 242. In examples, suction nozzle 250 includes a suction nozzle wall 254 defining at least some portion of a boundary of suction nozzle volume 252. Suction nozzle wall 254 may be a portion of and/or defined by housing 202. In examples, suction nozzle wall 254 is coupled to (e.g., mechanically coupled to and/or substantially unitary with) mixing portion wall 244. In some examples, suction nozzle wall 254 surrounds longitudinal axis L.

Suction nozzle 250 may be configured to limit an expansion of second gas flow G2 flowing from suction chamber 206 to mixing portion volume 242. In examples, suction nozzle 250 defines a suction nozzle radius RN extending from longitudinal axis L to suction nozzle wall 254 (e.g., extending to an inner surface 253 defined by suction nozzle wall 254). Suction nozzle wall 254 may be configured to cause suction nozzle radius RN to decrease as suction nozzle 250 (e.g., suction nozzle wall 254) extends toward mixing portion wall 244. In some examples, suction nozzle 250 is configured such that nozzle radius RN decreases from a value greater than mixing portion radius RM to a value substantially equal to mixing portion radius RM. For example, nozzle radius RN may decrease to the value substantially equal to mixing portion radius RM at a location where suction nozzle wall 254 couples to mixing portion wall 244. In examples, inner surface 253 faces towards and/or surrounds longitudinal axis L.

In examples, jet pump assembly 110 is configured to define a flow passage 256 (FIG. 3) between suction nozzle wall 254 (e.g., inner surface 253) and a portion of needle body 230. Jet pump assembly 110 may be configured cause second gas flow G2 to flow through flow passage 256 when second gas flow G2 flows through suction nozzle volume 252. For example, needle body 230 may include a downstream needle portion 258 configured to extend into suction nozzle volume 252 when needle body 230 engages nozzle outlet 218 (e.g., when jet pump assembly 110 operates in the first mode and/or needle body 230 is in the first position). Downstream needle portion 258 is a portion of body portion 231. Jet pump assembly 110 may define flow passage 256 between inner surface 253 and a downstream outer surface 260 defined by downstream needle portion 258. In examples, downstream outer surface 260 substantially surrounds and/or faces away from longitudinal axis L. In examples, downstream outer surface 260 is a portion of needle outer surface 235.

Flow passage 256 may be configured to limit expansion of second gas flow G2 as second gas flow G2 flows through flow passage 256. In examples, flow passage 256 is configured such that a cross-sectional flow area defined between downstream outer surface 260 and inner surface 253 remains substantially constant as flow passage 256 extends toward mixing portion volume 242. In examples, the cross-sectional flow area may be substantially perpendicular to longitudinal axis L, first direction D1, and/or second direction D2. Keeping the cross-sectional flow area substantially constant may mitigate any expansion of second gas flow G2 as second gas flow G2 flow proceeds through passage 256 toward mixing portion volume 242.

For example, inner surface 253 and/or downstream outer surface 260 may be configured to a define a plurality of cross-sectional flow areas such as first flow area FA1, second flow area FA2 displaced (e.g., in first direction D1) from first flow area FA1, and third flow area FA3 displaced (e.g., in first direction D1) from second flow area FA2 (FIG. 3). Flow passage 256 may be configured such that second gas flow G2 flows through each of first flow area FA1, second flow area FA2, and third flow area FA3 when second gas flow G2 flow proceeds through passage 256 toward mixing portion volume 242. Inner surface 253 and/or downstream outer surface 260 may be configured such that the cross-sectional area encompassed by first flow area FA1 is substantially equal to the cross-sectional area encompassed by second flow area FA2 and substantially equal to the cross-sectional area encompassed by third flow area FA3. In some examples, jet pump assembly 110 is configured such that first flow area FA1 is substantially equal to the cross-sectional area encompassed by second flow area FA2 and substantially equal to the cross-sectional area encompassed by third flow area FA3 when needle body 230 is in the first position and/or in one of the second positions (e.g., a second position wherein needle forward end 237 is displaced from nozzle outlet in the first direction D1).

Inner surface 253 and/or downstream outer surface 260 may define any number of cross-sectional flow areas such as first flow area FA1, second flow area FA2, and third flow area FA3. For example, first flow area FA1, second flow area FA2, third flow area FA3, and other cross-sectional flow areas defined by inner surface 253 and/or downstream outer surface 260 may be representative of a plurality of volume segments (e.g., infinitesimally thin volume segments) defined by flow passage 256 and through which second gas flow G2 flows enroute to mixing portion volume 242. In examples, one or more cross-sectional flow areas defined by jet pump assembly 110 such as first flow area FA1, second flow area FA2, and/or third flow area FA3 may surround longitudinal axis L. In examples, a plurality of cross-sectional flow areas such as first flow area FA1, second flow area FA2, and third flow area FA3 define a plurality of annular-shaped areas, wherein each annular shaped area of the plurality defines a cross-sectional area substantially equal to a cross-sectional area defined by every other annular shaped area of the plurality.

Defining a plurality of cross-sectional flow areas such as first flow area FA1, second flow area FA2, third flow area FA3, and/or others which encompass substantially equal cross-sectional areas may limit expansion of second gas flow G2, potentially limiting and/or mitigating pressure loss of second gas flow G2 when second gas flow G2 flows from suction chamber 206 to mixing portion volume 242. This may decrease and/or delay a need to provide first gas flow G1 to jet pump assembly 110 for the service of the gas load (e.g., decrease and/or delay a need for jet pump assembly 110 to operate in the second mode), such that extraction of first gas flow G1 from a higher compression stage of turbine engine 102 (FIGS. 1, 2) is mitigated.

In examples, downstream outer surface 260 extends to needle forward end 237. In examples, needle body 230 is configured to position needle forward end 237 in one of suction nozzle volume 252 or mixing portion volume 242 at least when needle body 230 engages nozzle outlet 218 (e.g., when needle body 230 is in the first position and/or jet pump assembly 110 operates in the first mode). In some examples, needle body 230 is configured to position needle forward end 237 in one of suction nozzle volume 252 or mixing portion volume 242 when needle body 230 is disengaged from nozzle outlet 218 (e.g., when jet pump assembly 110 operates in the second mode and/or the third mode).

As discussed, in the second mode (FIG. 4), jet pump assembly 110 is configured to receive both first gas flow G1 and second gas flow G2 and supply gas GS is substantially a mixture of first gas flow G1 and second gas flow G2. When jet pump assembly 110 operates in the second mode, needle body 230 may be disengaged from nozzle outlet 218 such that HP chamber 204 and exhaust portion 224 are fluidically coupled through nozzle flow area 232. In examples, nozzle flow area 232 is defined between nozzle wall 220 and needle outer surface 235 (e.g., forward needle surface 266 and/or downstream outer surface 260). In examples, nozzle flow area 232 is a cross-sectional area substantially perpendicular to longitudinal axis L. In the second mode, jet pump assembly 110 may be configured to accelerate first gas flow G1 between HP chamber 204 and nozzle flow area 232 to reduce the pressure of first gas flow G1 discharging via nozzle flow area 232, such that the reduced pressure allows second gas flow G2 to enter suction chamber 206 and/or suction nozzle volume 252 via second inlet 210.

In examples, needle body 230 (e.g., needle outer surface 235) and/or nozzle wall 220 define a throat region 261 within nozzle volume 221 when needle body 230 disengages from nozzle outlet 218. Needle body 230 and/or nozzle wall 220 may be configured to cause first gas flow G1 to substantially converge as first gas flow G1 flows from HP chamber 204 to throat region 261 to cause the acceleration and pressure reduction of first gas flow G1. In examples, jet pump assembly 110 is configured to operate in the second mode when needle body 230 is positioned in one of the one or more second positions (e.g., when control circuitry 122 causes needle body 230 to position in one of the one or more second positions).

Needle body 230 and/or nozzle wall 220 may define throat region 261 between a mid-needle surface 262 defined by needle body 230 and an inner surface 264 of nozzle wall 220 ("inner nozzle surface 264"). In examples, needle body 230 defines a forward needle surface 266 extending from mid-needle surface 262 in a direction (e.g., first direction D1) from nozzle inlet 222 toward nozzle outlet 218 when needle body 230 is within nozzle volume 221. Needle body 230 may define a rear needle surface 268 extending from mid-needle surface 262 in a direction (e.g., second direction D2) from nozzle outlet 218 to nozzle inlet 222 when needle body 230 is within nozzle volume 221. Forward needle surface 266 and/or rear needle surface 268 may be a portion of and/or contiguous with needle outer surface 235. Downstream outer surface 260 may be a portion of and/or contiguous with forward needle surface 266.

In examples, throat region 261 defines a throat width W between mid-needle surface 262 and inner surface 264. Throat width W may be substantially perpendicular to longitudinal axis L. Jet pump assembly 110 may be configured to cause first gas flow G1 to flow through throat region 261 as first gas flow G1 flows through nozzle volume 221 from HP chamber 204 to nozzle outlet 218.

In examples, jet pump assembly 110 (e.g., needle body 230 and/or nozzle wall 220) is configured to cause throat width W to vary when needle body 230 moves relative to nozzle wall 220. For example, jet pump assembly 110 may be configured to cause throat width W to increase when needle body 230 moves in second direction D2 relative to nozzle wall 220. Jet pump assembly 110 may be configured to cause throat width W to decrease when needle body 230 moves in first direction D1 relative to nozzle wall 220. Jet pump assembly 110 may be configured to such that the variation in throat width W varies the acceleration of first gas flow G1 between HP chamber 204 and nozzle flow area 232, and varies the corresponding pressure reduction of first gas flow G1. Variation in the pressure reduction of first gas flow G1 (e.g., through variation of throat width W) may cause a variation in the pressure of first gas flow G1 discharging through nozzle outlet 218, causing variation in a pressure of supply gas GS discharged by exhaust portion 224. For example, movement of needle body 230 to cause an increase in throat width W (e.g., movement in second direction D2) may increase the pressure of first gas flow G1 discharging through nozzle outlet 218 and increase the pressure of supply gas GS. Movement of needle body 230 to cause a decrease in throat width W (e.g., movement in first direction D1) may decrease the pressure of first gas flow G1 discharging through nozzle outlet 218 and decrease the pressure of supply gas GS.

In examples, needle body 230 (e.g., body portion 231) and/or nozzle wall 220 define a rear needle flow section 270 within nozzle volume 221 when needle body 230 disengages from nozzle outlet 218. Rear needle flow section 270 may be fluidically coupled to HP chamber 204 and throat region 261. In examples, rear needle flow section 270 is a portion of nozzle volume 221. Needle body 230 and/or nozzle wall 220 (e.g., inner nozzle surface 264) may be configured to cause first gas flow G1 to flow through rear needle flow section 270 when first gas flow G1 flows from HP chamber 204 to throat region 261. Needle body 230 and/or nozzle wall 220 (e.g., inner nozzle surface 264) may be configured to cause first gas flow G1 to substantially converge as first gas flow G1 flows from HP chamber 204 to throat region 261 to cause the acceleration and pressure reduction of first gas flow G1.

In examples, rear needle flow section 270 is defined by a gap G between rear needle surface 268 and inner nozzle surface 264. Rear needle surface 268 may be configured to cause a gas width GW of gap G to decrease as rear needle surface 268 extends toward throat region 261 (e.g., extends from shaft portion 233 toward throat region 261). In examples, gas width GW extends from rear needle surface 268 to inner nozzle surface 264. In examples, gap width GW is substantially perpendicular to longitudinal axis L. Rear needle surface 268 may be configured such that an increase in body radius RB as rear needle surface 268 extends toward throat region 261 causes gas width GW to decrease as rear needle surface 268 extends toward throat region 261. In some examples, rear needle flow section 270 surrounds at least some portion of body portion 231 and/or longitudinal axis L.

Needle body 230 (e.g., body portion 231) and/or nozzle wall 220 may be configured to limit expansion of first gas flow G1 as first gas flow G1 flows from throat region 261 to nozzle flow area 232. In examples, needle body 230 (e.g., body portion 231) and/or nozzle wall 220 define a forward needle flow section 272 within nozzle volume 221 when needle body 230 disengages from nozzle outlet 218. Forward needle flow section 272 may be fluidically coupled to throat region 261 and nozzle flow area 232. In examples, forward needle flow section 272 is a portion of nozzle volume 221. Needle body 230 and/or nozzle wall 220 (e.g., inner nozzle surface 264) may be configured to cause first gas flow G1 to flow through forward needle flow section 272 when first gas flow G1 flows from throat region 261 to nozzle flow area 232. In some examples, forward needle flow section 272 surrounds at least some portion of body portion 231 and/or longitudinal axis L.

In some examples, inner surface 253 and/or downstream outer surface 260 may be configured to a define a second plurality of cross-sectional flow areas 274 ("second FA plurality 274") including flow areas similar to first flow area FA1, second flow area FA2, and third flow area FA3 when needle body 230 is positioned in one of the one or more second positions (e.g., when jet pump assembly 110 is operating in the second mode). Flow passage 256 may be configured such that second gas flow G2 flows through second FA plurality 274 when needle body 230 is positioned in the one of the one or more second positions and second gas flow G2 flow proceeds through passage 256 toward mixing portion volume 242. Inner surface 253 and/or downstream outer surface 260 may be configured such that each flow area of second FA plurality 274 encompasses a cross-sectional flow area substantially equal to a cross-sectional flow area encompassed by the other flow areas of second FA plurality 274.

Second FA plurality 274 may define any number of cross-sectional flow areas. In examples, the cross-sectional flow areas defined by second FA plurality 274 are representative of a plurality of volume segments (e.g., infinitesimally thin volume segments) defined by flow passage 256 and through which second gas flow G2 flows when needle body 230 is positioned in one of the one or more second positions (e.g., when jet pump assembly 110 is operating in the second mode). In examples, the cross-sectional flow areas defined by second FA plurality 274 surround longitudinal axis L. In examples, the cross-sectional flow areas defined by second FA plurality 274 define a plurality of annular-shaped areas, wherein each annular shaped area defined by second FA plurality 274 defines a cross-sectional area substantially equal to a cross-sectional area defined by every other annular shaped area defined by second FA plurality 274.

As discussed, needle body 230 may be configured to position (e.g., relative to nozzle outlet 218) in any one of a plurality of second positions wherein needle body 230 is disengaged (e.g., displaced in second direction D2) from nozzle outlet 218. In examples, jet pump assembly 110 is configured to position needle body 230 in one of the one or more second positions when jet pump assembly 110 operates in the second mode. Jet pump assembly 110 is configured to control a parameter of gas supply GS (e.g., a pressure and/or a temperature) using the one or more second positions. For example, jet pump assembly 110 may be configured such that an initial second position of needle body 230 causes a first value of the parameter of gas supply GS (e.g., a first pressure and/or a first temperature). Jet pump assembly 110 may be configured such that a subsequent second position of needle body 230 causes a second value of the parameter of gas supply GS (e.g., a second pressure different from the first pressure and/or a second temperature different from the first temperature). In examples, jet pump assembly 110 (e.g., based on a control signal from control circuitry 122) is configured to transition needle body 230 from the initial second position to the subsequent second position based on a fluid parameter sensed by sensor 124, 172, 174 (FIG. 1, 2).

In the second mode, jet pump assembly 110 is configured to produce supply gas GS in exhaust portion 224 by mixing first gas flow G1 received via first inlet 208 and second gas flow G2 received via second inlet 210. In examples, jet pump assembly 110 is configured to mix first gas flow G1 and second gas flow G2 in a mixing ratio. The mixing ratio may define the relative proportion of first gas flow G1 to second gas flow G2 combined when jet pump assembly 110 produces supply gas GS. In examples, the mixing ratio defines a ratio of a mass of a first gas of first gas flow G1 to a mass of a second gas of second gas flow G2. The mass of the first gas and the mass of the second gas may be defined as mass quantities, mass flow rates, or any other mass-dependent parameters of first gas flow G1 and second gas flow G2. The first gas and the second gas may be gases having the same or substantially similar compositions. In examples, air comprises the first gas and the second gas.

Jet pump assembly 110 may be configured to alter the mixing ratio in order to establish a steady-state mixing ratio which produces a fluid parameter of gas supply GS satisfying a system setpoint for a fluid parameter sensed by sensor 124, 172, 174 (FIG. 1, 2). For example, if the fluid parameter sensed by sensor 124, 172 174 is a pressure and the system setpoint is a pressure setpoint, jet pump assembly 110 may be configured to establish a steady-state mixing ratio that causes a certain amount of first gas flow G1 to mix with a certain amount of second gas flow G2, such that supply gas GS exiting exhaust outlet 226 generates a pressure at sensor 124, 172, 174 satisfying the pressure setpoint. In examples, jet pump assembly 110 is configured to establish the steady-state mixing ratio by controlling the mass flow of first gas flow G1 received from turbine engine 102 (e.g., via HP conduit 118 (FIG. 1,2)) and/or the mass flow of second gas flow G2 received from turbine engine 102 (e.g., from LP conduit 116). In examples, the system setpoint is defined by a range of values around a central setpoint value, and the fluid parameter of the supply gas satisfies the system setpoint when the fluid parameter falls within the range. In examples, the system setpoint is defined by a specific setpoint value, and the fluid parameter of the supply gas satisfies the system setpoint when the fluid parameter is substantially equal to (e.g., within 1%, 5%, 10%, or some other percentage of) the specific setpoint value.

Jet pump assembly 110 may be configured to alter the mixing ratio by altering a dimension of nozzle flow area 232 and/or throat width W defined between nozzle wall 220 and needle body 230. Jet pump assembly 110 may be configured such that the dimension of nozzle flow area 232 and/or throat width W controls a mass flow and/or pressure reduction of first gas flow G1, such that the dimension of nozzle flow area 232 and/or throat width W controls the mixing ratio defined.

In examples, needle body 230 is configured to alter the dimension of nozzle flow area 232 and/or throat width W when needle body 230 transitions among the one or more second positions (e.g., transitions from the initial second position to the subsequent second position). For example, needle body 230 may be configured to decrease nozzle flow area 232 and/or throat width W when needle body 230 translates in first direction D1 relative to nozzle wall 220 (e.g., translates toward exhaust portion 224). Needle body 230 may be configured to increase nozzle flow area 232 and/or throat width W when needle body 230 translates in second direction D2 relative to nozzle wall 220 (e.g., translates away from exhaust portion 224). Hence, jet pump assembly 110 may be configured to alter the mixing ratio of first gas flow G1 to second gas flow G2 combined to produce supply gas GS at least when jet pump assembly 110 operates in the second mode.

As discussed, in the third mode (FIG. 5), jet pump assembly 110 is configured such that reception of second gas flow G2 is substantially avoided, and supply gas GS is largely comprised of first gas flow G1. Jet pump system 106 (e.g., control circuitry 122 and/or jet pump assembly 110) may be configured to position needle body 230 in the third position to cause jet pump assembly 110 to operate in the third mode. When jet pump assembly 110 operates in the third mode, needle body 230 positions relative to nozzle wall 220 such that the pressure reduction of first gas flow G1 is minimized and/or otherwise limited as first gas flow G1 flows between HP chamber 204 and nozzle flow area 232. In examples, jet pump assembly 110 is configured to increase throat width W of throat region 234 to minimize and/or otherwise limit the pressure reduction of first gas flow G1. For example, jet pump assembly 110 may be configured to increase throat width W as needle body 230 moves in second direction D2 relative to nozzle wall 220.

The increase in throat width W may act to cause an increase in the pressure of first gas flow G1 discharging via nozzle flow area 232 (e.g., due to a decreased acceleration through throat region 234). The increased pressure of first gas flow G1 discharging through nozzle flow area 232 may limit and/or otherwise prevent the entry of second gas flow G2 into suction chamber 206, such that supply gas GS is largely comprised of first gas flow G1 with minimal or no contribution from second gas flow G2. In examples, air bleed system 100 (FIG. 1-2) and/or jet pump assembly 110 includes a flow control valve 236 (e.g., a check valve, such as valve 148 (FIG. 2)) configured to limit and/or substantially prevent a fluid flow (e.g., first gas flow G1) from discharging from suction chamber 206 via second inlet 210 (e.g., discharging to LP conduit 116). In examples, jet pump assembly 110 is configured to operate in the third mode when needle body 230 is positioned in the position (e.g., when control circuitry 122 causes needle body 230 to position in the third position).

Jet pump assembly 110 may be configured to limit expansion of first gas flow G1 as first gas flow G1 discharges from nozzle outlet 218 and enters mixing portion volume 242. Limiting the expansion of first gas flow G1 (e.g., when jet pump operates in the third mode) may limit and/or minimize pressure losses experienced by first gas flow G1 as first gas flow G1 flows through jet pump assembly 110 to exhaust outlet 226. This may assist in the provision of gas loads 108 using supply gas GS under conditions when pressures of both first gas flow G1 and second gas flow G2 may be reduced (e.g., when turbine engine 102 is operating under reduced load).

For example, first cross-sectional area A1 may define an area which is equal to or greater than at least 50% of second cross-sectional area A2 in some examples, and may define an area which is equal to or greater than at least 80% of second cross-sectional area A2 in some examples. In some examples, second cross-sectional area A2 is less than or substantially equal to first cross-sectional area A1. For example, in some examples, first cross-sectional area A1 defines an area greater than second cross-sectional area A2 and less than or equal to 1.2 times second cross-sectional area A2. In some examples, first cross-sectional area A1 defines an area greater than second cross-sectional area A2 and less than or equal to 1.5 times second cross-sectional area A2. In some examples, first cross-sectional area A1 defines an area greater than 1.5 times second cross-sectional area A2. Reducing a difference in the areas defined by first cross-sectional area A1 and second cross-sectional area A2 may assist in limiting an expansion of first gas flow G1 as first gas flow G1 discharges from nozzle outlet 218 and enters and/or flow through mixing portion volume 242. In some examples (e.g., when jet pump assembly 110 operates in the third mode and/or needle body 230 is in the third position), needle body 230 is configured to position relative to nozzle wall 220 such that such that needle forward end 237 is displaced in second direction D2 from first cross-sectional area A1, and such that first gas flow G1 flows through substantially the entirety of first cross-sectional area A1 when first gas flow G1 discharges through nozzle outlet 218. As used herein, when first cross-sectional area A1 is compared to second cross-sectional area A2 (e.g., at least 80%, greater than but less than 1.2, greater then 1.5, etc.), this may refer to a comparison of a first area measurement quantifying the area of first cross-sectional A1 when compared to a second area measurement quantifying the area of second cross-sectional area A2. In examples, at least one of the first area measurement or the second area measurement quantifies an area substantially perpendicular to longitudinal axis L.

In examples, inner nozzle 216 is configured to extend into suction nozzle volume 252. Inner nozzle 216 may be configured such that nozzle outlet 218 is positioned in suction nozzle volume 252. This may assist in limiting an expansion of first gas flow G1 as first gas flow G1 discharges from nozzle outlet 218 and enters and/or flow through mixing portion volume 242. In some examples, nozzle outlet 218 may be configured to cause first gas flow G1 to discharge through nozzle outlet and into suction nozzle volume 252. In some examples, inner nozzle 216 may be configured such that nozzle radius RN defines a maximum nozzle radius greater than mean radius defined by first cross-sectional area A1. In examples, the maximum nozzle radius is displaced from first cross-sectional area A1 in the second direction D2.

In some examples, in addition to or instead of first cross-sectional area A1, needle body 230 (e.g., body portion 231) and/or nozzle wall 220 may be configured to limit expansion of first gas flow G1 as first gas flow G1 discharges from nozzle outlet 218 and enters mixing portion volume 242. For example, inner nozzle surface 264 and/or needle outer surface 235 (e.g., forward needle surface 266) may be configured to a define a plurality of cross-sectional flow areas such as fourth flow area FA4, fifth flow area FA5 displaced (e.g., in first direction D1) from fourth flow area FA4, and sixth flow area FA6 displaced (e.g., in first direction D1) from fifth flow area FA5. Inner nozzle surface 264 and/or needle outer surface 235 may be configured such that first gas flow G1 flows through each of fourth flow area FA4, fifth flow area FA5, and sixth flow area FA6 when first gas flow G1 flow proceeds through forward needle flow section 272 and/or nozzle flow area 232 (e.g., between inner nozzle surface 264 and/or needle outer surface 235). Inner nozzle surface 264 and/or needle outer surface 235 may be configured such that the cross-sectional area encompassed by fourth flow area FA4 is substantially equal to the cross-sectional area encompassed by fifth flow area FA5 and substantially equal to the cross-sectional area encompassed by sixth flow area FA6. In examples, the cross-sectional area encompassed by fourth flow area FA4 is substantially equal to the cross-sectional area encompassed by fifth flow area FA5 and substantially equal to the cross-sectional area encompassed by sixth flow area FA6 at least when needle body 230 is in the third position.

Inner nozzle surface 264 and/or needle outer surface 235 may define any number of cross-sectional flow areas such as fourth flow area FA4, fifth flow area FA5, and sixth flow area FA6. For example, fourth flow area FA4, fifth flow area FA5, sixth flow area FA6 and other cross-sectional flow areas defined by inner nozzle surface 264 and/or needle outer surface 235 may be representative of a plurality of volume segments (e.g., infinitesimally thin volume segments) defined by forward needle flow section 272 and/or nozzle flow area 232 and through which first gas flow G1 flows enroute to mixing portion volume 242. In examples, one or more cross-sectional flow areas defined by inner nozzle surface 264 and/or needle outer surface 235 such as fourth flow area FA4, fifth flow area FA5, and/or sixth flow area FA6 may surround longitudinal axis L. In examples, a plurality of cross-sectional flow areas such as fourth flow area FA4, fifth flow area FA5, and/or sixth flow area FA6 define a plurality of annular-shaped areas, wherein each annular shaped area of the plurality defines a cross-sectional area substantially equal to a cross-sectional area defined by every other annular shaped area of the plurality. Defining a plurality of cross-sectional flow areas such as fourth flow area FA4, fifth flow area FA5, and/or sixth flow area FA6, and/or others which encompass substantially equal cross-sectional areas may limit expansion of first gas flow G1, potentially limiting and/or mitigating pressure loss of first gas flow G1 when first gas flow G1 flows from HP chamber 204 to mixing portion volume 242.

Figure 6:
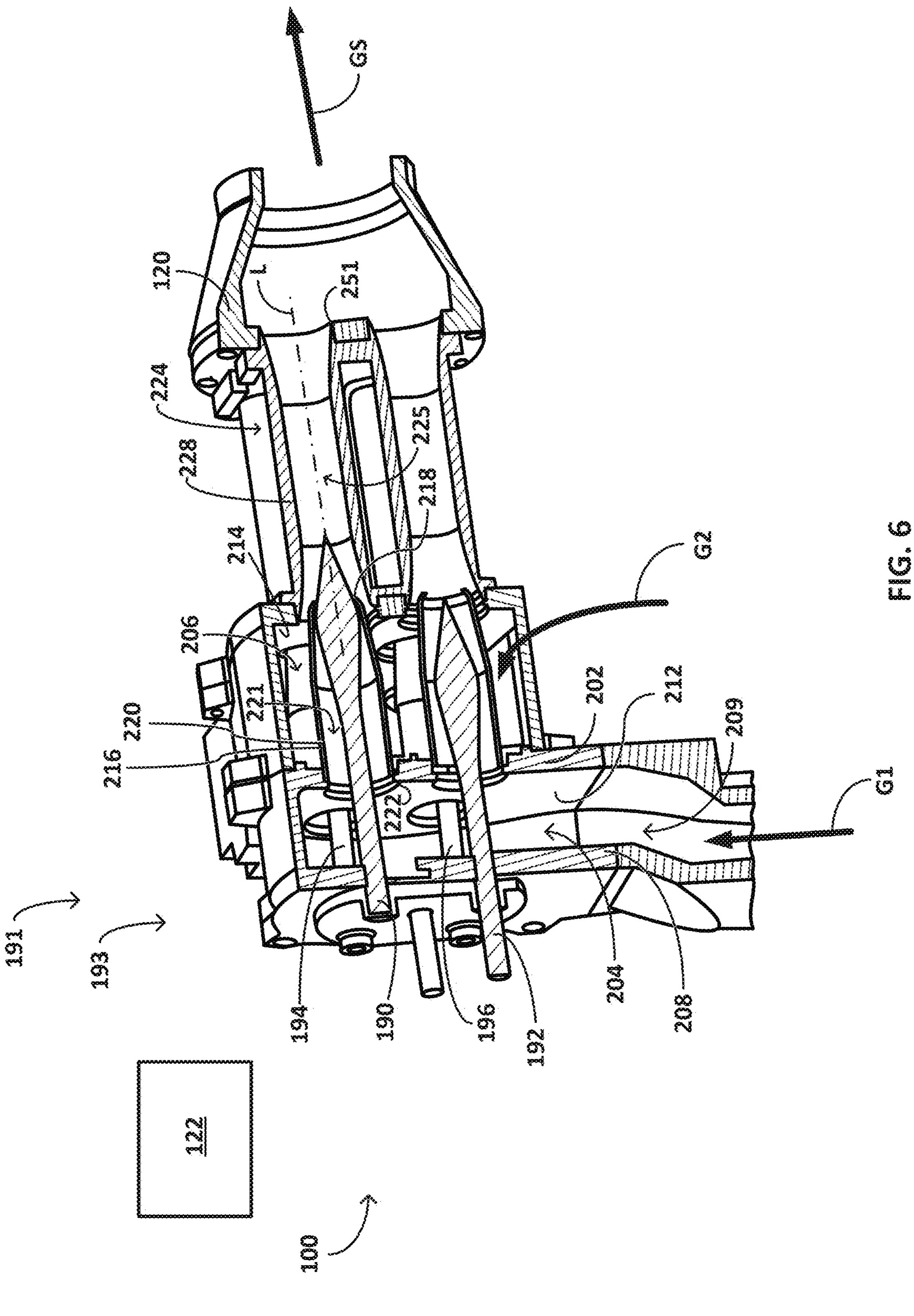
FIG. 6 is perspective cross-section view of a jet pump system including a plurality of jet pump assemblies, the cross-section taken with a cutting plane that includes a longitudinal axis L.

FIG. 6 is a perspective illustration of an example jet pump system 191 having a plurality of jet pumps 193 ("jet pump assemblies 193"). Jet pump assemblies 193 may include, for example, jet pump assembly 190, jet pump assembly 192, jet pump assembly 194, jet pump assembly 196, and/or other jet pump assemblies. Jet pump system 191 is an example of jet pump system 106. Jet pump assembly 190, jet pump assembly 192, jet pump assembly 194, jet pump assembly 196, and/or other jet pump assemblies of jet pump system 191 may be examples of and/or configured similarly to jet pump assembly 110. FIG. 6 illustrates jet pump system 106 in cross-section, with a cutting plane that includes longitudinal axis L extending through jet pump assembly 190.

Jet pump system 191 is configured to receive first gas flow G1 via first inlet opening 209 and substantially distribute first gas flow G1 among jet pump assemblies 193. For example, jet pump system 191 be configured to distribute first gas flow G1 such that jet pump assembly 190 receives a first HP flow, jet pump assembly 192 receives a second HP flow, jet pump assembly 194 receives a third HP flow, and/or jet pump assembly 196 receives a fourth HP flow. Each of the first HP flow, the second HP flow, the third HP flow, and the fourth HP flow may be portions of first gas flow G1. In examples, HP chamber 204 is configured to distribute first gas flow G1 such that jet pump assembly 190 receives the first HP flow, jet pump assembly 192 receives the second HP flow, jet pump assembly 194 receives the third HP flow, and/or jet pump assembly 196 receives the fourth HP flow.

Jet pump system 191 is configured to receive the second gas flow G2 via suction chamber 206 and substantially distribute the second gas flow G2 among jet pump assemblies 193. For example, jet pump system 191 may be configured to distribute second gas flow G2 such that jet pump assembly 190 receives a first LP flow, jet pump assembly 192 receives a second LP flow, jet pump assembly 194 receives a third LP flow, and/or jet pump assembly 196 receives a fourth LP flow. Each of the first LP flow, the second LP flow, the third LP flow, and the fourth LP flow may be portions of second gas flow G2. In examples, suction chamber 206 is configured to distribute second gas flow G2 such that jet pump assembly 190 receives the first LP flow, jet pump assembly 192 receives the second LP flow, jet pump assembly 194 receives the third LP flow, and/or jet pump assembly 196 receives the fourth LP flow.

Each of jet pump assemblies 193 may be configured to provide an individual discharge gas stream comprising an HP flow distributed by HP chamber 204 and/or an LP flow distributed by suction chamber 206. For example, jet pump assembly 190 may be configured to provide a first discharge stream comprising the first HP flow and/or the first LP flow. Jet pump assembly 192 may be configured to provide a second discharge stream comprising the second HP flow and/or the second LP flow. Jet pump assembly 194 may be configured to provide a third discharge stream comprising the third HP flow and/or the third LP flow. Jet pump assembly 196 may be configured to provide a fourth discharge stream comprising the fourth HP flow and/or the fourth LP flow. In examples, each of jet pump assemblies 193 is configured to issue a discharge gas stream from a pump assembly outlet, such as exhaust outlet 251 of jet pump assembly 190. Exhaust outlet 251 is an example of exhaust outlet 226.

Each of jet pump assemblies 193 may be configured to operate in the first mode, the second mode, and the third mode. For example, in substantially the same manner jet pump assembly 110 limits first gas flow G1 in its first mode, jet pump assembly 190 may be configured to limit the first HP flow in a first mode of jet pump assembly 190, jet pump assembly 192 may be configured to limit the second HP flow in a first mode of jet pump assembly 194, jet pump assembly 196 may be configured to limit the third HP flow in a first mode of jet pump assembly 194, and jet pump assembly 196 may be configured to limit the fourth HP flow in a first mode of jet pump assembly 196. In substantially the same manner jet pump assembly 110 mixes first gas flow G1 and second gas flow G2 in its second mode, jet pump assembly 190 may be configured to mix the first HP flow and the first LP flow in a first mode of jet pump assembly 190, jet pump assembly 192 may be configured to mix the second HP flow and the second LP flow in a second mode of jet pump assembly 192, jet pump assembly 194 may be configured to mix the third HP flow and the third LP flow in a second mode of jet pump assembly 194, and jet pump assembly 196 may be configured to mix the fourth HP flow and the fourth LP flow in a second mode of jet pump assembly 196. In substantially the same manner jet pump assembly 110 limits second gas flow G2 in its third mode, jet pump assembly 190 may be configured to limit the first LP flow in a third mode of jet pump assembly 190, jet pump assembly 192 may be configured to limit the second LP flow in a third mode of jet pump assembly 194, jet pump assembly 196 may be configured to limit the third LP flow in a third mode of jet pump assembly 194, and jet pump assembly 196 may be configured to limit the fourth LP flow in a third mode of jet pump assembly 196.

Jet pump system 191 is configured to provide the individual discharge gas streams of jet pump assemblies 193 (e.g., the first discharge gas stream, second discharge gas stream, third discharge gas stream, and/or fourth discharge gas stream) and/or mixtures thereof to supply conduit 120 (FIG. 1, 2).

During operation of jet pump system 191, a given jet pump assembly (e.g., jet pump assembly 190, jet pump assembly 192, jet pump assembly 194, or jet pump assembly 196) may operate in the first mode, the second mode, or the third mode independent of a mode in which another jet pump assembly of jet pump system 191 operates. Stated similarly, jet pump system 191 is configured such that jet pump assembly 190 may establish any of the first mode, second mode, or third mode to provide the first discharge stream as jet pump assembly 192 establishes any of the first mode, second mode, or third mode to provide the second discharge stream, and/or as jet pump assembly 194 establishes any of the first mode, second mode, or third mode to provide duce the third discharge stream, and/or as jet pump assembly 196 establishes any of the first mode, second mode, or third mode to produce the fourth discharge stream. Hence, the pressure of gas supply GS as the first discharge stream, the second discharge stream, the third discharge stream, and the fourth discharge stream may be dependent on the particular modes at which the jet pump assemblies of jet pump system 191 are individually operating.

Jet pump system 191 (e.g., control circuitry 122) may be configured to alter the mode at which any jet pump assembly of jet pump system 191 operates to control a property of supply gas GS (e.g., a pressure of supply gas GS) provided to supply conduit 120 of bleed system 100. In examples, when each jet pump assembly of jet pump system 191 is individually operating in an initial mode (e.g., one of the first mode, the second mode, or the third mode) such that a property of supply gas GS has an initial value (e.g., an initial pressure), control circuitry 122 may be configured to cause the property to have subsequent value by causing one or more of the jet pump assemblies of jet pump system 191 to alter its mode of operation from the initial mode ((e.g., one of the first mode, the second mode, or the third mode) to a subsequent mode (e.g., another of the first mode, the second mode, or the third mode). Control circuitry 122 may be configured to cause one or more of the jet pump assemblies of jet pump system 191 to alter its mode of operation from the initial mode to the subsequent mode in response to a comparison of the fluid parameter of gas supply GS sensed by sensor 124, 172, 174 (FIG. 1, 2) and a system setpoint.

Bleed system 100 can include any suitable jet pumps configured to be controlled by control circuitry 122 to operate in the first mode, operate in the second mode, or operate in the third mode, and/or adjust a ratio of a lower pressure gas and a higher pressure gas mixed by jet pump assembly 110 (e.g., in the second mode). Jet pump assembly 110 can include a variable nozzle or other variable geometry the enables variable mixing of bleed air to meet the minimum pressure and flow requirements for gas loads 108 served by bleed system 100. In examples, jet pump assembly 110 can be sized and controlled such that a jet pump assembly bypass valve and/or bypass conduit can be eliminated (e.g., a valve and/or conduit which fluidically couples turbine engine 102 and supply conduit 120 in a manner bypassing jet pump assembly 110 can be eliminated). Jet pump assembly 110 may be configured to position such that the flow restriction and pressure drop of the higher pressure gas is reduced adequately such that the jet pump assembly bypass valve and/or bypass conduit can be eliminated.

Figure 7:
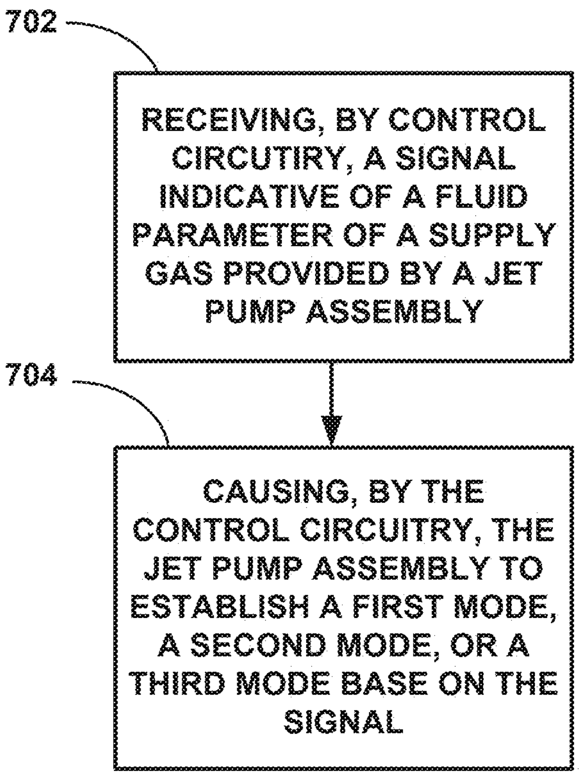
FIG. 7 is a flow diagram illustrating an example method of producing a supply gas.

FIG. 7 illustrates a flow diagram of an example technique for providing a supply gas to a bleed system. Although the technique is described with reference to jet pump assembly 110 and/or bleed system 100 (FIGS. 1-6), in other examples, the technique may be used with other components and/or systems.

The technique includes receiving, by control circuitry 122 of a jet pump system 106, 191, a signal indicative of a fluid parameter of a supply gas GS provided by a jet pump assembly 110, 190, 192, 194, 196 (collectively, "jet pump assembly 110-196") (702). In examples, jet pump assembly 110-196 is a portion of a bleed system 100 supplying supply gas GS to one or more gas loads 108, such as ECS 136, fuel tank system 138, ADU 140, and/or anti-icing system 142. The one or more gas loads 108 may be configured to operate as transient loads within bleed system 100, such that the overall demands of gas loads 108 may vary during operation of bleed system 100. In examples, control circuitry 122 receives the signal from sensor 124, 172, 174 configured to sense the fluid parameter. The fluid parameter may be, for example, a pressure, a temperature, a flow rate, or some other fluid parameter of the mixed gas within bleed system 100. The technique includes causing, by control circuitry 122, jet pump assembly 110-196 to operate in one of a first mode, a second mode, or a third mode based on the signal (704).

In examples, jet pump assembly 110-196 operates in the first mode wherein supply gas GS is comprised substantially of second gas flow G2. Control circuitry 122 may cause jet pump assembly 110-196 to establish a first position to cause jet pump assembly 110-196 to operate in the first mode. In examples, a needle body 230 engages a nozzle outlet 218 in the first position. In examples, jet pump assembly 110-196 operates in the second mode wherein supply gas GS is comprised of first gas flow G1 and second gas flow G2. Control circuitry 122 may cause jet pump assembly 110-196 to establish one of one or more second positions to cause jet pump assembly 110-196 to operate in the second mode. In examples, needle body 230 is displaced from nozzle outlet 218 in a direction D1 in the second position. In examples, jet pump assembly 110-196 operates in a third mode wherein supply gas GS is comprised substantially of first gas flow G1. In examples, needle body 230 establishes a maximum displacement from nozzle outlet 218 in the direction D1 in the third position. Control circuitry 122 may cause jet pump assembly 110-196 to establish a third position to cause jet pump assembly 110-196 to operate in the third mode.

In examples, control circuitry 122 compares the signal to a system setpoint and causes jet pump assembly 110-196 to operate in the first mode, the second mode, or the third mode based on the comparison. In examples, control circuitry 122 receives the system setpoint via a communication link 176. In some examples, control circuitry 122 establishes the system setpoint. For example, control circuitry 122 may receive one or more load signals from gas loads 108 via communication links 178, 180, 182, 184, 185 and establishes the system setpoint based on the one or more load signals.

In examples, an inner nozzle 216 of jet pump assembly 110-196 receives first gas flow G1 from an HP chamber 204 defined by a housing 202. In some examples, a suction chamber 206 defined by housing 202 receives second gas flow G2. HP chamber 204 may receive first gas flow G1 via a first inlet 208 defined by housing 202 and coupled to a HP conduit 118 configured to provide a higher pressure gas (e.g., from a turbine engine 102). Suction chamber 206 may receive second gas flow G2 via a second inlet 210 defined by housing 202 and coupled to a LP conduit 116 configured to provide a lower pressure gas (e.g., from a turbine engine 102) having a pressure lower than the higher pressure gas.

The technique may include discharging, through a first cross-sectional area A1 defined by a nozzle outlet 218 of inner nozzle 216, the first gas flow G1. In examples, the technique includes discharging, through a second cross-sectional area A2 less than or equal to first cross-sectional area A1, a supply gas GS comprising at least the first gas flow G1 through exhaust portion 224 defining second cross-sectional area A2. In some examples, the technique includes discharging first gas flow G1 through first cross-sectional area A1 defining an area greater than second cross-sectional area A2 and less than or equal to 1.2 times second cross-sectional area A2. In some examples, the technique includes discharging first gas flow G1 through first cross-sectional area A1 defining an area greater than second cross-sectional area A2 and less than or equal to 1.5 times second cross-sectional area A2. In some examples, the technique includes discharging first gas flow G1 through first cross-sectional area A1 defining an area greater than 1.5 times second cross-sectional area A2. In some examples, supply gas flow GS comprises first gas flow G1 received via nozzle outlet 218 and second gas flow G2 received via suction chamber 206. In examples, exhaust portion 224 receives at least one of first gas flow G1 or second gas flow G2 in a mixing portion 238 defining a mixing portion volume 242.

The technique may include accelerating first gas flow G1 to reduce a pressure of first gas flow G1 as first gas flow G1 flows through throat region 261. In examples, needle body 230 and/or nozzle wall 220 causes a width W of throat region 261 to increase when needle body 230 moves relative to nozzle wall 220 in a direction from nozzle outlet 218 toward high pressure chamber 204 (e.g., in second direction D2). The technique may include increasing width W to cause an increase in a pressure of first gas flow G1 discharging from nozzle outlet 218. In examples, needle body 230 and/or nozzle wall 220 causes width W to decrease when needle body 230 moves relative to nozzle wall 220 in a direction from higher pressure chamber 204 toward nozzle outlet 218 (e.g., in first direction D1). The technique may include decreasing width W to cause a decrease in the pressure of first gas flow G1 discharging from nozzle outlet 218. In examples, control circuitry 122 causes needle body 230 to move relative to nozzle wall 220 to increase width W, increase the pressure of first gas flow G1 discharging from nozzle outlet 218, decrease width W, and/or decrease the pressure of first gas flow G1 discharging from nozzle outlet 218. In examples, first gas flow G1 flows through a nozzle flow area 232 defined by a forward needle surface 266 of needle body 230 and inner nozzle surface 264.

Needle body 230 may extend a downstream needle portion 258 into suction nozzle volume 252 when needle body 230 engages nozzle outlet 218 (e.g., when jet pump assembly 110 operates in the first mode). Needle body 230 may cause second gas flow G2 to flow through a flow passage 256 defined between downstream needle portion 258 and a suction nozzle wall 254 of suction nozzle 250 when needle body 230 engages nozzle outlet 218. In examples, flow passage 256 defines a substantially constant flow area FA1, FA2, FA3 as flow passage 256 extends from nozzle outlet 218 toward exhaust portion 224. In examples, jet pump assembly 110 causes second gas flow G2 to flow through a substantially constant flow area FA1, FA2, FA3 as second gas flow G2 flows through passage 256. In examples, needle body 230 extends downstream needle portion 258 into suction nozzle volume 252 when jet pump assembly 110 operates in the second mode and/or the third mode. In some examples, jet pump assembly 110 causes first gas flow G1 to flow through a substantially constant flow area FA4, FA5, FA6 as first gas flow G1 flows through a forward needle flow section 272.

As used here, when a first portion of a system (e.g., air bleed system 100 and/or jet pump system 106, 191) is substantially parallel to a second portion of the system or an axis defined by the system, this may mean the first portion is parallel or nearly parallel to the second portion or the axis to the extent permitted by manufacturing tolerances. In some examples, when the first portion is substantially parallel to the second portion or the axis, this may mean a first vector defined by the first component of the system defines an angle of less than 10 degrees, in some examples less than 5 degrees, and in some examples less than 1 degree, with a second vector defined by the second component or the axis. When a first portion of the system is substantially perpendicular to a second portion of or an axis defined by the system, this may mean the first portion is perpendicular or nearly perpendicular to the second portion or the axis to the extent permitted by manufacturing tolerances. In some examples, when the first portion is substantially perpendicular to the second portion or the axis, this may mean that the first vector defined by the first component of the system defines an angle of at least 80 degrees, in some examples at least 85 degrees, and in some examples at least 89 degrees, with the second vector defined by the second component. The first portion may be a first component of the system, a first axis and/or first vector defined by the first system, a first plane defined by the first system, a first area defined by the first system, and/or another portion of the first system. The second portion may be a second component of the system, a second axis and/or second vector defined by the second system, a second plane defined by the second system, a second area defined by the second system, and/or another portion of the second system.

As used here, when a first quantity described for a system (e.g., air bleed system 100 and/or jet pump system 106) is substantially equal to a second quantity described for the system or another system, this may mean the first quantity is equal to or nearly equal to the second quantity to the extent permitted by manufacturing tolerances. In some examples, when the first quantity is substantially equal to the second quantity, this may mean a difference between the first quantity and the second quantity is less than 10% of, in some examples less than 5% of, and in some examples less than 1% of, the first quantity or the second quantity.

As used here, when a first portion of a system (e.g., air bleed system 100 and/or jet pump system 106,191) supports a second portion of the system, this means that when the second portion causes a first force to be exerted on the first portion, the first portion causes a second force to be exerted on the second portion in response to the first force. The first force and/or second force may be a contact force and/or an action-at-a-distance force. For example, first force and/or second force may be mechanical force, a magnetic force, a gravitational force, or some other type of force. The first portion of the system may be a portion of the system or a portion of a component of the system. The second portion of the system may be another portion of the system or another portion of the same component or a different component. In some examples, when the first portion of the system supports the second portion of the system, this may mean the second portion is mechanically supported by and/or mechanically connected to the first portion.

Control circuitry 122 may include any suitable arrangement of hardware, software, firmware, or any combination thereof, to perform the techniques attributed to control circuitry 122 herein. Examples of control circuitry 122 include any one or more microprocessors, digital signal processors (DSPs), application specific integrated circuits (ASICs), field programmable gate arrays (FPGAs), or any other equivalent integrated or discrete logic circuitry, as well as any combinations of such components. When control circuitry 122 includes software or firmware, control circuitry 122 further includes any necessary hardware for storing and executing the software or firmware, such as one or more processors or processing units. In general, a processing unit may include one or more microprocessors, DSPs, ASICs, FPGAs, or any other equivalent integrated or discrete logic circuitry, as well as any combinations of such components.

A system setpoint for bleed system 100 may be stored in a memory of control circuitry 122 or in another device communicatively coupled to control circuitry 122. The memory may include any volatile or non-volatile media, such as a random access memory (RAM), read only memory (ROM), non-volatile RAM (NVRAM), electrically erasable programmable ROM (EEPROM), flash memory, and the like. In addition, in some examples, the memory or another memory may also store executable instructions for causing control circuitry 122 described herein to perform the actions attributed to it.

Communication links 123, 125, 176, 178, 180, 182, 184, 185 (collectively, "communication links 123-185") may be hard-line and/or wireless communications links. Communication links 123-185 may comprise some portion of control circuitry 122, sensor 124, and/or one or more of gas loads 108. Communication links 123-185 may comprise a wireless Internet connection, a direct wireless connection such as wireless LAN, Bluetooth™, Wi-Fi™, and/or an infrared connection. Communication links 123-185 may utilize any wireless or remote communication protocol.

Sensor 124, bleed temperature sensor 168, manifold temperature sensor 170, first manifold pressure sensor 172, and/or second manifold pressure sensor 174 (collectively "bleed system sensors") may be configured to generate a signal indicative of a fluid parameter at any location within bleed system 100. One or more of the bleed system sensors may be configured to generate the signal as a result of an interaction with supply gas GS within bleed system 100. One or more of the bleed system sensors may include a transducer configured to transduce the interaction into the signal indicative of the fluid parameter. The indicative signal may be an analog electrical signal or a digital signal. In some examples, one or more of the bleed system sensors may include processing circuitry configured to interpret a response of the transducer and generate the indicative signal, and/or control circuitry 122 may include processing circuitry configured to interpret a response of the transducer and generate the indicative signal. One or more of the bleed system sensors may be configured to communicate the indicative signal indicative to other devices in data communication the one or more of the bleed system sensors.

Valve 148, mid-pressure valve 152, over pressure shut off valve 154, fan air valve 156, flow control valve 160, valve 162, valve 164, and/or valve 166 (collectively "bleed system valves") may be configured to operate in any manner and with any type of valve operation system. One or more of the bleed system valves may be a pneumatically operated valve, a hydraulically operated valve, a manually operated valve, a motor-driven valve, or a valve configured to operate in another manner. One or more of the bleed system valves may be configured to operate based on a communication from control circuitry 122 or other control circuitry. Control circuitry 122 or the other control circuitry may be configured to cause operation of one or more of the bleed system valves based on the fluid parameter of the supply gas within bleed system 100, other parameters within bleed system 100, other operations conducted by aircraft 104, and/or other reasons.

The techniques described in this disclosure, including those attributed to control circuitry 122 and other control circuitry, processing circuitry, sensors, or various constituent components, may be implemented, at least in part, in hardware, software, firmware or any combination thereof. For example, various aspects of the techniques may be implemented within one or more processors, including one or more microprocessors, DSPs, ASICs, FPGAs, or any other equivalent integrated or discrete logic circuitry, as well as any combinations of such components, embodied in any suitable device. Processing circuitry, control circuitry, and sensing circuitry, as well as other processors, controllers, and sensors described herein, may be implemented at least in part as, or include, one or more executable applications, application modules, libraries, classes, methods, objects, routines, subroutines, firmware, and/or embedded code, for example. In addition, analog circuits, components, and circuit elements may be employed to construct one, some or all of the control circuitry and sensors, instead of or in addition to the partially or wholly digital hardware and/or software described herein. Accordingly, analog or digital hardware may be employed, or a combination of the two.

In one or more examples, the functions described in this disclosure may be implemented in hardware, software, firmware, or any combination thereof. If implemented in software, the functions may be stored on, as one or more instructions or code, a computer-readable medium and executed by a hardware-based processing unit. The computer-readable medium may be an article of manufacture including a non-transitory computer-readable storage medium encoded with instructions. Instructions embedded or encoded in an article of manufacture including a non-transitory computer-readable storage medium encoded, may cause one or more programmable processors, or other processors, to implement one or more of the techniques described herein, such as when instructions included or encoded in the non-transitory computer-readable storage medium are executed by the one or more processors. Example non-transitory computer-readable storage media may include RAM, ROM, programmable ROM (PROM), erasable programmable ROM (EPROM), electronically erasable programmable ROM (EEPROM), flash memory, a hard disk, a compact disc ROM (CD-ROM), a floppy disk, a cassette, magnetic media, optical media, or any other computer readable storage devices or tangible computer readable media.

In some examples, a computer-readable storage medium comprises non-transitory medium. The term "non-transitory" may indicate that the storage medium is not embodied in a carrier wave or a propagated signal. In certain examples, a non-transitory storage medium may store data that can, over time, change (e.g., in RAM or cache).

The functionality described herein may be provided within dedicated hardware and/or software modules. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components. Also, the techniques could be fully implemented in one or more circuits or logic elements.

The present disclosure includes the following examples.

Example 1: A system, comprising: a jet pump assembly configured to receive a lower pressure gas from a lower pressure stage of a turbine engine and receive a higher pressure gas from a higher pressure stage of the turbine engine, wherein the jet pump assembly is configured to combine the lower pressure gas and the higher pressure gas to produce a supply gas, wherein the jet pump assembly is configured alter a mixing ratio of the higher pressure gas to the lower pressure gas combined by adjusting a position of a needle body of the jet pump assembly, wherein the jet pump assembly is configured to establish: a first mode wherein the supply gas is largely comprised of the lower pressure gas, a second mode wherein the supply gas includes both the lower pressure gas and the higher pressure gas, and a third mode wherein the supply gas largely comprised of the higher pressure gas; and control circuitry configured to receive a signal indicative of a fluid parameter of the supply gas, wherein the control circuitry is configured to cause the jet pump assembly to establish the first mode, the second mode, or the third mode based on the signal.

Example 2: The system of example 1 further comprising the turbine engine, wherein the turbine engine includes a plurality of compressor stages including at least a lower pressure stage and a higher pressure stage, the turbine engine configured to increase a pressure of a gas stream as the gas stream flows through the plurality of compressor stages from the lower pressure stage to the higher pressure stage, wherein the lower pressure stage is configured to provide the lower pressure gas to the jet pump assembly, and wherein the higher pressure stage is configured to provide the higher pressure gas to the jet pump assembly.

Example 3: The system of example 1 or example 2, further comprising a check valve configured to allow the lower pressure gas to flow from the lower pressure stage to the jet pump assembly, wherein the check valve is configured to limit the higher pressure gas from flowing from the jet pump assembly to the lower pressure stage.

Example 4: The system of any of examples 1-3, wherein the jet pump assembly comprises: an inner nozzle including a nozzle wall defining a nozzle outlet, wherein the inner nozzle is configured to receive the higher pressure gas from a high pressure chamber defined by a housing of the jet pump assembly and discharge the higher pressure gas through the nozzle outlet; and a suction chamber defined by the housing, wherein the suction chamber is configured to receive the lower pressure gas, wherein the needle body configured to move relative to the nozzle wall within the inner nozzle, wherein the needle body is configured to cause the higher pressure gas to flow through a throat region between the nozzle wall and the needle body when the jet pump assembly establishes the second mode or establishes the third mode, wherein the needle body defines a rear needle surface extending in a direction from the high pressure chamber toward the throat region, the rear needle surface configured to cause a gap between the rear needle surface and the nozzle wall to decrease as the rear needle surface extends toward the throat region, such that the gap causes an acceleration of the higher pressure gas as the higher pressure gas flows through the throat region, and wherein the needle body is configured to engage the nozzle outlet when the jet pump assembly establishes the first mode, such that the supply gas substantially comprises only the lower pressure gas.

Example 5: The system of example 4, wherein the needle body is configured to position in a first position relative to the nozzle wall when the jet pump assembly establishes the first mode and configured to position in a third position relative to the nozzle wall when the jet pump assembly establishes the third mode, wherein the needle body is configured to travel relative to the nozzle wall over a range bounded by the first position and the third position, wherein the needle body is configured to establish a maximum displacement from the nozzle outlet in the third position, and wherein the needle body is configured to position relative to the nozzle wall at one of a plurality of positions between the first position and the third position when the jet pump assembly establishes the second mode.

Example 6: The system of example 4 or example 5, wherein; the jet pump assembly further comprises an exhaust portion including a mixing portion defining a mixing portion volume, the housing defines a suction nozzle defining a suction nozzle volume fluidically coupled to the suction chamber, wherein the suction nozzle volume is fluidically coupled to the mixing portion volume, the inner nozzle defines a longitudinal axis extending through the nozzle outlet, the suction nozzle volume, and the mixing portion volume, the longitudinal axis defines a suction nozzle radius extending from the longitudinal axis to a suction nozzle wall defining the suction nozzle volume, and the suction nozzle wall is configured to cause the suction nozzle radius to decrease as the suction nozzle wall extends in a direction from the suction chamber toward the mixing portion volume.

Example 7: The system of example 6, wherein the inner nozzle is configured to position the nozzle outlet within the suction nozzle volume.

Example 8: The system of any of example 6 or example 7, wherein the throat region defines a width substantially perpendicular to the longitudinal axis and extending between the nozzle wall and the needle body, and wherein the needle body is configured to increase the width of the throat region when the needle body moves relative to the nozzle wall in a direction from the nozzle outlet toward the high pressure chamber.

Example 9: The system of any of examples 1-8, wherein the control circuitry is configured to determine a setpoint for the fluid parameter, and wherein the control circuitry is configured to compare the fluid parameter indicated by the signal with the setpoint and control the jet pump assembly to establish the first mode, the second mode, or the third mode based on the comparison of the fluid parameter indicated by the signal and the setpoint.

Example 10: The system of example 9, wherein the control circuitry is configured to receive a load signal from a gas load configured to receive the supply gas, wherein the control circuitry is configured to determine the setpoint based on the load signal.

Example 11: The system of example 10, further comprising the gas load, wherein the gas load comprises one or more of: an environmental control system configured to provide air to a cabin and enable heat transfer between the supply gas and the air, an air drive unit configured to pressurize a hydraulic system using the supply gas, an anti-icing system configured to cause removal of ice from an aircraft wing, a fuel tank system, or a pneumatic system configured to receive the supply gas.

Example 12: The system of example 10 or example 11, wherein the jet pump assembly is configured to issue the supply gas in an upstream direction of the gas load, and wherein the signal is indicative of a fluid parameter of the supply gas downstream of the gas load.

Example 13: The system of any of examples 9-12, further comprising a plurality of gas loads, wherein each gas load is configured to receive the supply gas, and wherein the each gas load is configured to provide a load signal indicative of an operating status of the each gas load to the control circuitry, and wherein the control circuitry is configured to determine the setpoint based on the load signals received from the plurality of gas loads.

Example 14: The system of example 13, wherein the control circuitry is configured to establish a first setpoint when the control circuitry receives a first combination of load signals from the plurality of gas loads and configured to establish a second setpoint different from the first setpoint when the control circuitry receives a second combination of the load signals from plurality of gas loads and the second combination is different from the first combination.

Example 15: The system of any of examples 1-14, further comprising a sensor configured to sense the fluid parameter of the supply gas, wherein the sensor is configured to communicate the signal to the control circuitry.

Example 16: An air system for an aircraft comprising: a turbine engine including at least a lower pressure stage configured to issue a lower pressure gas and a higher pressure stage configured to issue a higher pressure gas as a gas stream flows through the lower pressure stage and the higher pressure stage, a jet pump assembly configured to receive the lower pressure gas and configured to receive the higher pressure gas, wherein the jet pump assembly is configured to combine the lower pressure gas and the higher pressure gas to produce a supply gas, wherein the jet pump assembly is configured alter a mixing ratio of the higher pressure gas to the lower pressure gas combined by adjusting a position of a needle body of the jet pump assembly, wherein the jet pump assembly is configured to establish: a first mode wherein the supply gas is largely comprised of the lower pressure gas, a second mode wherein the supply gas includes both the lower pressure gas and the higher pressure gas, and a third mode wherein the supply gas is largely comprised of the higher pressure gas; a check valve configured to allow the lower pressure gas to flow from the lower pressure stage to the jet pump assembly, wherein the check valve is configured to limit the higher pressure gas from flowing from the jet pump assembly to the lower pressure stage; and control circuitry configured to receive a signal indicative of a fluid parameter of the supply gas, wherein the control circuitry is configured to cause the jet pump assembly to establish the first mode, the second mode, or the third mode based on the signal.

Example 17: The system of example 16, wherein the control circuitry is configured to determine a setpoint for the fluid parameter, wherein the control circuitry is configured to compare the fluid parameter indicated by the signal with the setpoint and control the jet pump assembly to establish the first mode, the second mode, or the third mode based on the comparison, wherein the control circuitry is configured to receive a plurality of load signals, each load signal indicative of an operating status of a gas load of a plurality of gas loads, and wherein the control circuitry is configured to determine the setpoint based on the plurality of load signals received.

Example 18: The system of example 17, wherein the control circuitry is configured to establish a first setpoint when the plurality of load signals comprises a first combination of the load signals and configured to establish a second setpoint different from the first setpoint when the plurality of load signals comprises a second combination of the load signals different from the first combination.

Example 19: A method comprising: receiving, by control circuitry, a signal indicative of a fluid parameter of a supply gas in a system, wherein the supply gas is generated by a jet pump assembly configured to mix a lower pressure gas and a higher pressure gas to produce the supply gas, wherein the jet pump assembly is configured alter a mixing ratio of the higher pressure gas to the lower pressure gas combined by adjusting a position of a needle body of the jet pump assembly, and wherein the jet pump assembly is configured to define: a first mode wherein the supply gas is largely comprised of the lower pressure gas, a second mode wherein the supply gas includes both the lower pressure gas and the higher pressure gas, and a third mode wherein the supply gas is largely comprised of the higher pressure gas; and causing, by the control circuitry, the jet pump assembly to establish the first mode, the second mode, or the third mode based on the signal.

Example 20: The method of example 19, further comprising: receiving, by the jet pump assembly, the lower pressure gas from a lower pressure stage of a turbine engine; and receiving, by the jet pump assembly, the higher pressure gas from a higher pressure stage of the turbine engine, wherein the lower pressure gas comprises a first portion of a gas stream and the higher pressure gas comprises a second portion of the gas stream, and wherein the turbine engine is configured to increase a pressure of the gas stream as the gas stream flows from the lower pressure stage to the higher pressure stage.

Various examples have been described. These and other examples are within the scope of the following claims.

What is claimed is:

1. A system, comprising:

a jet pump assembly configured to receive a lower pressure gas from a lower pressure stage of a turbine engine and receive a higher pressure gas from a higher pressure stage of the turbine engine, the jet pump assembly comprising:

an inner nozzle including a nozzle wall defining a nozzle outlet, wherein the inner nozzle is configured to receive the higher pressure gas from a high pressure chamber defined by a housing of the jet pump assembly and discharge the high pressure gas through the nozzle outlet; and a suction chamber defined by the housing, wherein the suction chamber is configured to receive the lower pressure, wherein the jet pump assembly is configured to combine the lower pressure gas and the higher pressure gas to produce a supply gas, wherein the jet pump assembly is configured to alter a mixing ratio of the higher pressure gas to the lower pressure gas combined by adjusting a position of a needle body of the jet pump assembly relative to the nozzle wall within the inner nozzle, wherein the jet pump assembly is configured to establish:

a first mode wherein the supply gas is largely comprised of the lower pressure gas, a second mode wherein the supply gas includes both the lower pressure gas and the higher pressure gas, and a third mode wherein the supply gas largely comprised of the higher pressure gas; and control circuitry configured to receive a signal indicative of a fluid parameter of the supply gas, wherein the control circuitry is configured to cause the jet pump assembly to establish the first mode, the second mode, or the third mode based on the signal, wherein the needle body is configured to cause the high pressure gas to flow through a throat region between the nozzle wall and the needle body when the jet pump assembly establishes the second mode or establishes the third mode, and wherein the needle body is configured to engage the nozzle outlet when the jet pump assembly establishes the first mode, such that the supply gas substantially comprises only the lower pressure gas.

2. The system of claim 1, further comprising the turbine engine, wherein the turbine engine includes a plurality of compressor stages including at least the lower pressure stage and the higher pressure stage, the turbine engine configured to increase a pressure of a gas stream as the gas stream flows through the plurality of compressor stages from the lower pressure stage to the higher pressure stage, wherein the lower pressure stage is configured to provide the lower pressure gas to the jet pump assembly, and wherein the higher pressure stage is configured to provide the higher pressure gas to the jet pump assembly.

3. The system of claim 2, further comprising a check valve configured to allow the lower pressure gas to flow from the lower pressure stage to the jet pump assembly, wherein the check valve is configured to limit the higher pressure gas from flowing from the jet pump assembly to the lower pressure stage.

4. The system of claim 1, wherein the needle body defines a rear needle surface extending in a direction from the high pressure chamber toward the throat region, the rear needle surface configured to cause a gap between the rear needle surface and the nozzle wall to decrease as the rear needle surface extends toward the throat region, such that the gap causes an acceleration of the higher pressure gas as the higher pressure gas flows through the throat region.

5. The system of claim 1, wherein the needle body is configured to position in a first position relative to the nozzle wall when the jet pump assembly establishes the first mode and configured to position in a third position relative to the nozzle wall when the jet pump assembly establishes the third mode, wherein the needle body is configured to travel relative to the nozzle wall over a range bounded by the first position and the third position, wherein the needle body is configured to establish a maximum displacement from the nozzle outlet in the third position, and wherein the needle body is configured to position relative to the nozzle wall at one of a plurality of positions between the first position and the third position when the jet pump assembly establishes the second mode.

6. The system of claim 1, wherein;

the jet pump assembly further comprises an exhaust portion including a mixing portion defining a mixing portion volume, the housing defines a suction nozzle defining a suction nozzle volume fluidically coupled to the suction chamber, wherein the suction nozzle volume is fluidically coupled to the mixing portion volume, the inner nozzle defines a longitudinal axis extending through the nozzle outlet, the suction nozzle volume, and the mixing portion volume, the longitudinal axis defines a suction nozzle radius extending from the longitudinal axis to a suction nozzle wall defining the suction nozzle volume, and the suction nozzle wall is configured to cause the suction nozzle radius to decrease as the suction nozzle wall extends in a direction from the suction chamber toward the mixing portion volume.

7. The system of claim 6, wherein the inner nozzle is configured to position the nozzle outlet within the suction nozzle volume.

8. The system of claim 6, wherein the throat region defines a width substantially perpendicular to the longitudinal axis and extending between the nozzle wall and the needle body, and wherein the needle body is configured to increase the width of the throat region when the needle body moves relative to the nozzle wall in a direction from the nozzle outlet toward the high pressure chamber.

9. The system of claim 1, wherein the control circuitry is configured to determine a setpoint for the fluid parameter, and wherein the control circuitry is configured to compare the fluid parameter indicated by the signal with the setpoint and control the jet pump assembly to establish the first mode, the second mode, or the third mode based on the comparison of the fluid parameter indicated by the signal and the setpoint.

10. The system of claim 9, wherein the control circuitry is configured to receive a load signal from a gas load configured to receive the supply gas, wherein the control circuitry is configured to determine the setpoint based on the load signal.

11. The system of claim 10, further comprising the gas load, wherein the gas load comprises one or more of:

an environmental control system configured to provide air to a cabin and enable heat transfer between the supply gas and the air, an air drive unit configured to pressurize a hydraulic system using the supply gas, an anti-icing system configured to cause removal of ice from an aircraft wing, a fuel tank system, or a pneumatic system configured to receive the supply gas.

12. The system of claim 10, wherein the jet pump assembly is configured to issue the supply gas in an upstream direction of the gas load, and wherein the signal is indicative of a fluid parameter of the supply gas downstream of the gas load.

13. The system of claim 9, further comprising a plurality of gas loads, wherein each gas load of the plurality of gas loads is configured to receive the supply gas, and wherein the each gas load is configured to provide a load signal indicative of an operating status of the each gas load to the control circuitry, and wherein the control circuitry is configured to determine the setpoint based on the load signals received from the plurality of gas loads.

14. The system of claim 13, wherein the control circuitry is configured to establish a first setpoint when the control circuitry receives a first combination of load signals from the plurality of gas loads and configured to establish a second setpoint different from the first setpoint when the control circuitry receives a second combination of the load signals from plurality of gas loads and the second combination is different from the first combination.

15. The system of claim 1, further comprising a sensor configured to sense the fluid parameter of the supply gas, wherein the sensor is configured to communicate the signal to the control circuitry.

16. An air system for an aircraft comprising:

a turbine engine including at least a lower pressure stage configured to issue a lower pressure gas and a higher pressure stage configured to issue a higher pressure gas as a gas stream flows through the lower pressure stage and the higher pressure stage, a jet pump assembly configured to receive the lower pressure gas and configured to receive the higher pressure gas, wherein the jet pump assembly is configured to combine the lower pressure gas and the higher pressure gas to produce a supply gas, wherein the jet pump assembly is configured to alter a mixing ratio of the higher pressure gas to the lower pressure gas combined by adjusting a position of a needle body of the jet pump assembly, wherein the jet pump assembly is configured to establish:

a first mode wherein the supply gas is largely comprised of the lower pressure gas, a second mode wherein the supply gas includes both the lower pressure gas and the higher pressure gas, and a third mode wherein the supply gas is largely comprised of the higher pressure gas;

a check valve configured to allow the lower pressure gas to flow from the lower pressure stage to the jet pump assembly, wherein the check valve is configured to limit the higher pressure gas from flowing from the jet pump assembly to the lower pressure stage; and control circuitry configured to:

receive a signal indicative of a fluid parameter of the supply gas, receive a plurality of load signals, each load signal of the plurality of load signals being indicative of an operating status of a gas load of a plurality of gas loads, determine, based on the plurality of load signals received, a setpoint for the fluid parameter, compare the fluid parameter indicated by the signal with the setpoint, and control the jet pump assembly to establish the first mode, the second mode, or the third mode based on the comparison.

17. The system of claim 16, wherein the control circuitry is configured to establish a first setpoint when the plurality of load signals comprises a first combination of the load signals and configured to establish a second setpoint different from the first setpoint when the plurality of load signals comprises a second combination of the load signals different from the first combination.

18. A method comprising:

receiving, by control circuitry, a signal indicative of a fluid parameter of a supply gas in a system, wherein the supply gas is generated by a jet pump assembly configured to mix a lower pressure gas and a higher pressure gas to produce the supply gas, wherein the jet pump assembly is configured to alter a mixing ratio of the higher pressure gas to the lower pressure gas combined by adjusting a position of a needle body of the jet pump assembly, and wherein the jet pump assembly is configured to define:

a first mode wherein the supply gas is largely comprised of the lower pressure gas, a second mode wherein the supply gas includes both the lower pressure gas and the higher pressure gas, and a third mode wherein the supply gas is largely comprised of the higher pressure gas;

receiving, by the control circuitry, a plurality of load signals, each load signal of the plurality of load signals being indicative of an operating status of a gas load of a plurality of gas loads;

determining, by the control circuitry and based on the plurality of load signals received, a setpoint for the fluid parameter:

comparing, by the control circuitry, the fluid parameter indicated by the signal with the setpoint; and causing, by the control circuitry, the jet pump assembly to establish the first mode, the second mode, or the third mode based on the comparison.

19. The method of claim 18, further comprising:

receiving, by the jet pump assembly, the lower pressure gas from a lower pressure stage of a turbine engine; and receiving, by the jet pump assembly, the higher pressure gas from a higher pressure stage of the turbine engine, wherein the lower pressure gas comprises a first portion of a gas stream and the higher pressure gas comprises a second portion of the gas stream, and wherein the turbine engine is configured to increase a pressure of the gas stream as the gas stream flows from the lower pressure stage to the higher pressure stage.

20. The method of claim 18, further comprising:

establishing, by the control circuitry, a first setpoint when the plurality of load signals comprises a first combination of the load signals; and establishing, by the control circuitry, a second setpoint different from the first setpoint when the plurality of load signals comprises a second combination of the load signals different from the first combination.

* * * * *